(12) United States Patent
McCormick et al.

(10) Patent No.: US 12,552,550 B2
(45) Date of Patent: *Feb. 17, 2026

(54) SYSTEM AND METHOD TO DETECT ANOMALOUS WINGTIP EXTENSION FOR A FOLDING WING TIP AIRCRAFT

(71) Applicant: THE BOEING COMPANY, Arlington, VA (US)

(72) Inventors: Patrick McCormick, Mukilteo, WA (US); Christopher Bujnowski, Everett, WA (US); George Moy, Seattle, WA (US); Sarah Sheehy, Shoreline, WA (US); Endri Kerci, Mountlake Terrace, WA (US); Austin Schantz, Everett, WA (US); Paul Ryan Leonard, Seattle, WA (US); Caitlin Boxell, Lancaster, CA (US); Erin Campbell, Lake Forest Park, WA (US); John W. Gunderson, Issaquah, WA (US)

(73) Assignee: THE BOEING COMPANY, Arlington, VA (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/357,570

(22) Filed: Jul. 24, 2023

(65) Prior Publication Data

US 2025/0033797 A1 Jan. 30, 2025
US 2025/0256862 A2 Aug. 14, 2025

(51) Int. Cl.
*B64F 5/60* (2017.01)
*B64D 45/00* (2006.01)
(Continued)

(52) U.S. Cl.
CPC ............... *B64F 5/40* (2017.01); *B64D 45/00* (2013.01); *G06F 11/0739* (2013.01); *G06F 11/079* (2013.01); *B64C 3/56* (2013.01)

(58) Field of Classification Search
CPC ....... B64F 5/40; B64D 45/00; G06F 11/0739; G06F 11/079; B64C 3/56
See application file for complete search history.

(56) References Cited

U.S. PATENT DOCUMENTS

| 5,427,329 A | 6/1995 | Renzelmann et al. |
| 5,452,643 A * | 9/1995 | Smith ...................... B64C 3/56 |
| | | 91/416 |

(Continued)

FOREIGN PATENT DOCUMENTS

EP 3409581 A1 12/2018

OTHER PUBLICATIONS

Extended European Search Report for application No. 24178232.5 dated Oct. 14, 2024, pp. 1-13.

*Primary Examiner* — Kito R Robinson
*Assistant Examiner* — Anthony Gabriel Mora
(74) *Attorney, Agent, or Firm* — Moore IP Law

(57) ABSTRACT

A folding wingtip aircraft includes a wing that includes a primary portion and a wingtip. The folding wingtip aircraft includes a folding wingtip system configured to rotate the wingtip relative to the primary portion. The folding wingtip aircraft also includes a flight control computer. The flight control computer is configured to, in response to a first determination that a wingtip position of the wingtip is not in a folded position when a second determination indicates that a last completed command by the folding wingtip system was a fold command, set error codes for the folding wingtip system. The flight control computer is also configured to change a setting to indicate that the folding wingtip aircraft is grounded based on the error codes.

20 Claims, 10 Drawing Sheets

(51) Int. Cl.
*B64F 5/40* (2017.01)
*G06F 11/07* (2006.01)
*B64C 3/56* (2006.01)

(56) References Cited

U.S. PATENT DOCUMENTS

| | | | |
|---|---|---|---|
| 9,123,189 B2 * | 9/2015 | Kollgaard | G06Q 50/00 |
| 2005/0007257 A1 * | 1/2005 | Rast | B64D 47/04 |
| | | | 340/815.45 |
| 2013/0197721 A1 | 8/2013 | Gu et al. | |
| 2014/0061371 A1 * | 3/2014 | Good | B64C 3/56 |
| | | | 244/49 |
| 2015/0014478 A1 * | 1/2015 | Lassen | B64C 3/56 |
| | | | 244/49 |
| 2015/0108283 A1 | 4/2015 | Thoreen et al. | |
| 2016/0207608 A1 | 7/2016 | Good et al. | |
| 2018/0170516 A1 * | 6/2018 | Niemiec | B64D 45/0005 |
| 2019/0152578 A1 | 5/2019 | Dege et al. | |
| 2019/0389559 A1 * | 12/2019 | Lorenz | B64C 3/56 |
| 2020/0023938 A1 | 1/2020 | Dege et al. | |
| 2020/0039630 A1 | 2/2020 | Kamila et al. | |
| 2020/0070997 A1 | 3/2020 | Bensmann | |
| 2020/0186603 A1 * | 6/2020 | Venugopalan | G07C 5/008 |
| 2020/0307762 A1 * | 10/2020 | Morrell | B64C 3/56 |
| 2020/0324878 A1 * | 10/2020 | Guida | B64C 13/16 |
| 2020/0377224 A1 | 12/2020 | Brighton et al. | |

* cited by examiner

SYSTEM AND METHOD TO DETECT ANOMALOUS WINGTIP EXTENSION FOR A FOLDING WING TIP AIRCRAFT

FIELD OF THE DISCLOSURE

The present disclosure is generally related to detecting anomalous wingtip extension for a folding wingtip aircraft.

BACKGROUND

As a general rule, larger aircraft and aircraft with longer wingspans tend to be more efficient for transporting people, cargo, or both. For example, operating larger aircraft, which can carry more passengers and payload, is generally more efficient between two destinations than flying several trips with smaller aircraft. Some airports are able to accommodate large wingspan aircraft (e.g., type F airports), however, taxiway spacing and gate locations for most airports were established without providing adequate spacing for aircraft with long wingspans.

To have a large wingspan and to accommodate wingspan limitations associated with some airports (e.g., type E airports), some aircraft are folding wingtip aircraft. Each wing of the aircraft includes a primary portion coupled to a fuselage of the aircraft, a wingtip that is configured to fold (e.g., rotate) relative to the primary portion, and a folding wingtip system configured to fold the wingtips relative to the primary portions. When the wingtips are in a flight position, the aircraft has a large wingspan to improve flight efficiency of the aircraft, and when the wingtips are in a folded position, the aircraft has a smaller wingspan that conforms to wingspan limitations of airports.

The folding wingtip systems (i.e., one folding wingtip system for each wing of the aircraft) are designed to raise and lower the wing tip. Although occurrence of anomalous operation of a folding wingtip system (e.g., due to human error, component failure, or both) is highly unlikely, it is desirable to detect if such an anomaly occurred and desirable to provide instructions detailing an appropriate response.

SUMMARY

In a particular implementation, an aircraft includes a wing. The wing includes a primary portion and a wingtip. The aircraft includes a folding wingtip system configured to rotate the wingtip relative to the primary portion. The aircraft also includes a flight control computer. The flight control computer is configured to, in response to a first determination that a wingtip position of the wingtip is not in a folded position when a second determination indicates that a last completed command by the folding wingtip system was a fold command, set error codes for the folding wingtip system. The flight control computer is also configured to change a setting to indicate that the aircraft is grounded based on the error codes.

In another particular implementation, a method includes determining, at a flight control computer of an aircraft, a wingtip position of a wingtip in response to a determination that a last completed command by a folding wingtip system was a fold command. The method includes, in response to the wingtip position indicating that the wingtip is not in a folded position, setting, via the flight control computer, first error codes for the folding wingtip system. The method includes, in response to the wingtip position indicating that the wingtip is not in the folded position, changing, via the flight control computer, a setting to indicate that the aircraft is grounded. The method also includes, in response to the wingtip position indicating that the wingtip is not in the folded position, scheduling, via the flight control computer, maintenance of the aircraft based on the first error codes.

In another particular implementation, a non-transitory computer-readable medium includes instructions executable by one or more processors of an aircraft. The instructions are executable by the one or more processors to determine a wingtip position of a wingtip of an aircraft in response to a determination that a last completed command by a folding wingtip system was a fold command. The instructions are executable by the one or more processors to, in response to the wingtip position indicating that the wingtip is not in a folded position, set first error codes for the folding wingtip system. The instructions are executable by the one or more processors to change a setting to indicate that the aircraft is grounded based on the first error codes. The instructions are also executable by the one or more processors to schedule maintenance of the aircraft based on the first error codes.

The features, functions, and advantages described herein can be achieved independently in various implementations or may be combined in yet other implementations, further details of which can be found with reference to the following description and drawings.

DETAILED DESCRIPTION

Figure 1A:
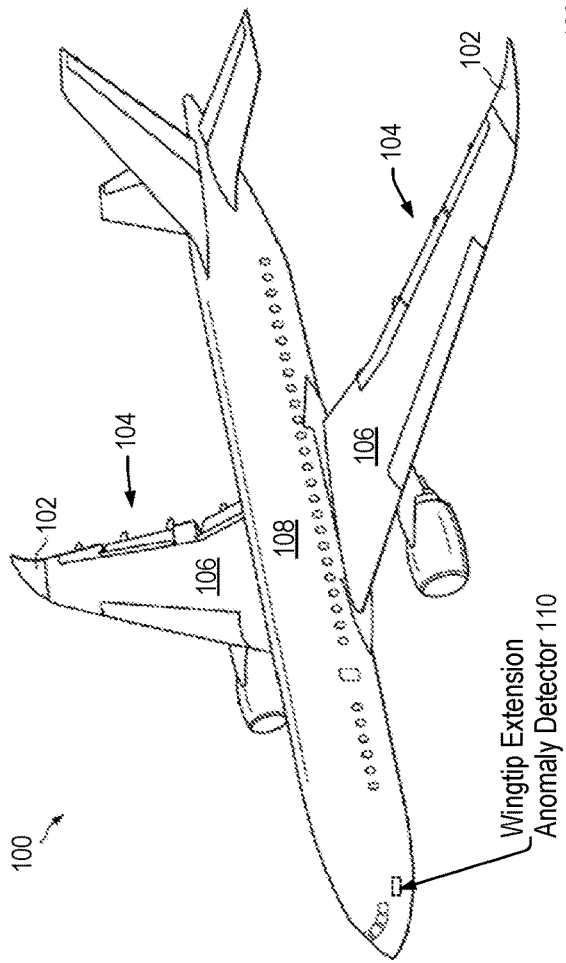
FIG. 1A depicts a representation of a folding wingtip aircraft, which includes a wingtip extension anomaly detector, with the wingtips in a flight position.

A folding wingtip aircraft includes a folding wingtip system for each wing of the aircraft. A folding wingtip system enables rotation of a wing from a flight position to a folded position and vice versa. The folding wingtip systems receive commands from a flight control computer to use the folding wingtip systems.

The folding wingtip systems are designed so that motion of the wingtips is controlled and the wingtips are secured in place by brake systems when the wingtips are in the folded position and are secured in place by latch pin systems when the wingtips are in the flight position. When a folding wingtip system of an aircraft fails to operate correctly to implement a command to change a wingtip from a first position (e.g., a folded position) to a second position (e.g., a flight position) based on data provided by sensors that monitor the folding wingtip system, the aircraft is grounded and scheduled for maintenance. A fault isolation manual, an aircraft maintenance manual, and information provided by a flight control computer of the aircraft are used by maintenance personnel to perform maintenance to determine why the folding wingtip system failed, to make the folding wingtip system functional, to address and correct problems caused by the failure, or combinations thereof.

Although it is very unlikely to occur, it is possible for a wingtip to fall from the folded position or to fall when the folding wingtip system is in use to change the position of the wingtip. Wingtip fall could be due to human error (e.g., improper maintenance), due to failure of one or more components of the folding wingtip system (e.g., failure of a torque tube that supports the wingtip as the wingtip is rotated from one position to another position), other causes, or combinations thereof. If a wingtip should fall, wingtip lugs of the wingtip could contact stops of a primary portion of the wing that provide an end limit to rotation for the wingtip, which may cause damage to one or more of the wingtip lugs, one or more of the stops, or both; or one or more wingtip lugs of the wingtip could contact one or more latch pins of the latch pin system, which could cause damage to one or more of the wingtip lugs, one or more latch pins, or both.

The present disclosure describes systems and methods that enable determination of anomalous wingtip extension, such as when a wingtip falls, and determination of a type of maintenance that is needed to return the aircraft to service. A technical advantage of the present disclosure is increased efficiency, reduced time that a folding wingtip aircraft is out of service for maintenance, and reduced cost associated with maintenance, due to maintenance scheduled for the aircraft as a result of failure of a folding wingtip system, including particular maintenance to address a probable cause of the failure of the folding wingtip system. The maintenance scheduled for the aircraft includes particular maintenance to be performed to address the probable cause of failure of the folding wingtip system identified based on sensor data obtained during use of the folding wingtip system. Another technical advantage is that maintenance scheduled for the aircraft identifies whether the wingtip fell, which can increase efficiency by eliminating a need for maintenance personnel to determine if the wingtip fell. If the maintenance scheduled for the aircraft indicates that the wingtip fell, particular components of the folding wingtip system that are identified based on sensor data as possibly having been damaged by the fall of the wingtip (e.g., one or more latch pins, one or more wingtip lugs, etc.) can be identified and examined for non-visible damage instead of having all components that could have been damaged by the fall examined for non-visible damage, which also increases efficiency, reduces time that the folding wingtip aircraft is out of service, and reduces costs associated with the maintenance.

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 3, multiple electronic controllers are illustrated and associated with reference numbers 316A and 316B. When referring to a particular one of these electronic controllers, such as the electronic controller 316A, the distinguishing letter "A" is used. However, when referring to any arbitrary one of these electronic controllers or to these electronic controllers as a group, the reference number 316 is used without a distinguishing letter.

Figure 2:
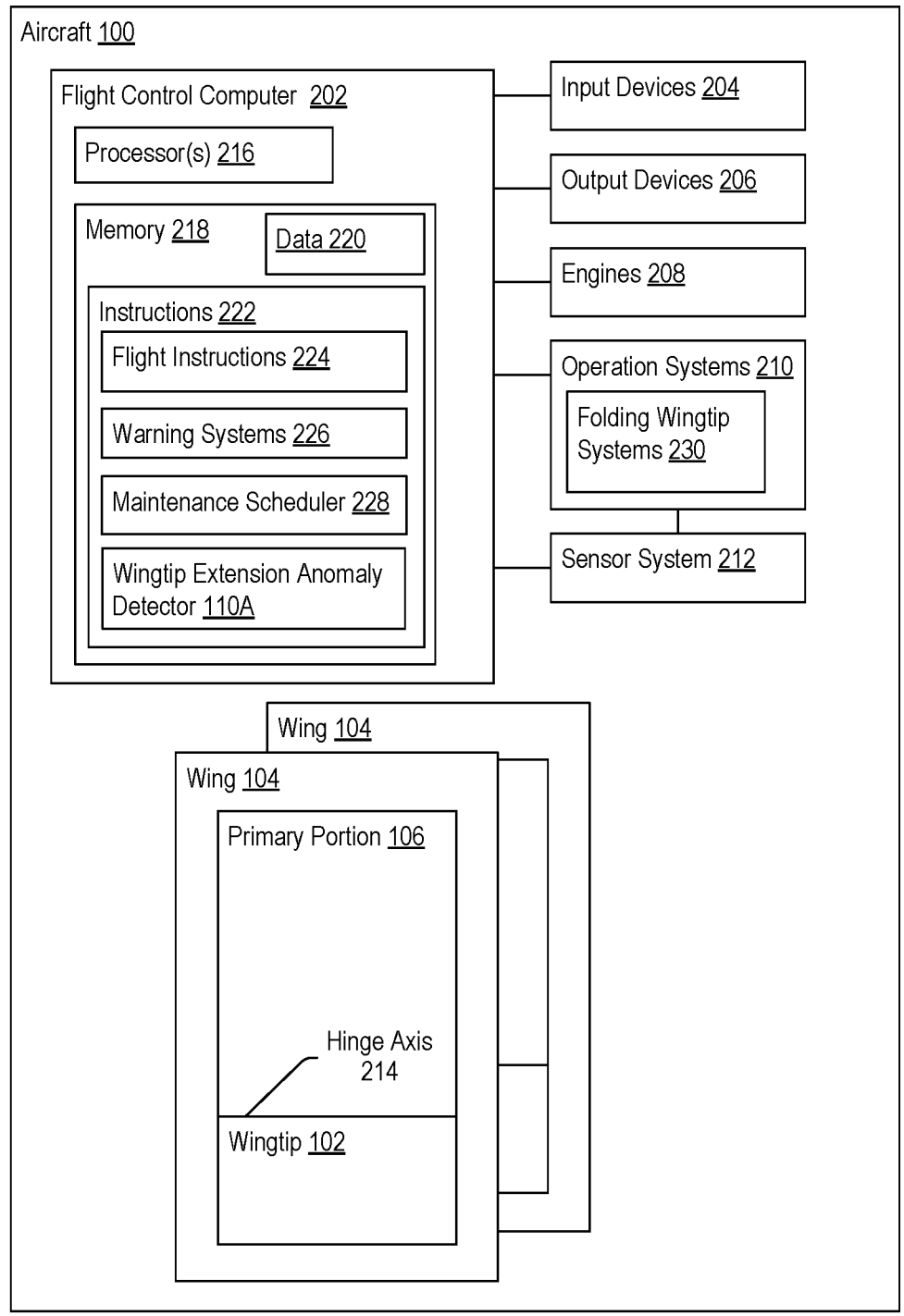
FIG. 2 is a block diagram of a folding wingtip aircraft that includes a wingtip extension anomaly detector.

The disclosure is directed to folding wingtip aircraft. The term "aircraft" as used herein refers to a folding wingtip aircraft. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 2 depicts a flight control computer 202 including one or more processors ("processor(s)" 216 in FIG. 2), which indicates that in some implementations the flight control computer 202 includes a single processor 216 and in other implementations the flight control computer 202 includes multiple processors 216. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements. As used herein, A "and/or" B may mean that either "A and B", or "A or B", or both "A and B" and "A or B" are applicable or acceptable.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1B:
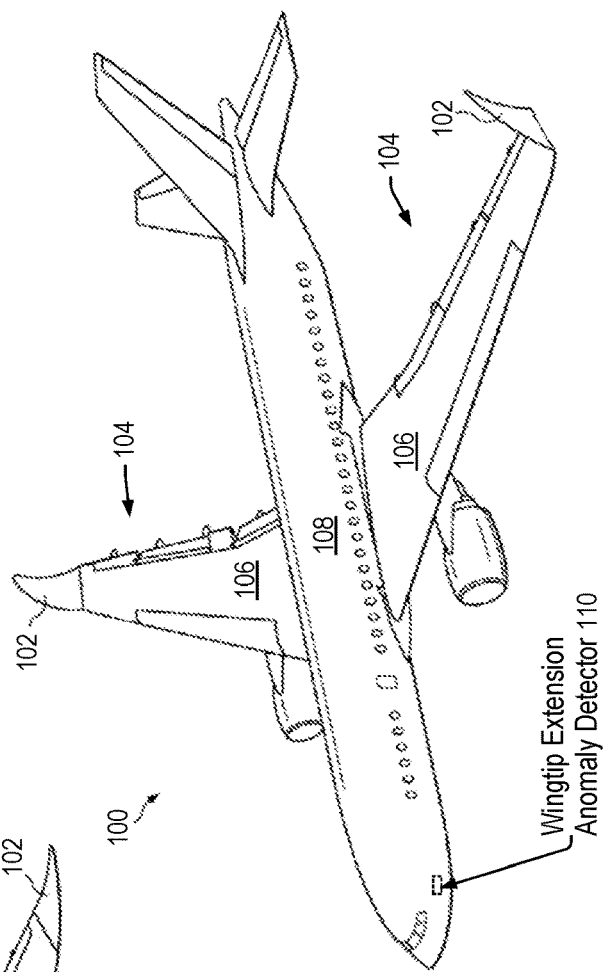
FIG. 1B depicts a representation of the folding wingtip aircraft of FIG. 1A with the wingtips in a folded position.

FIG. 1A depicts a representation of a folding wingtip aircraft 100 with wingtips 102 of the aircraft 100 in a flight position. FIG. 1B depicts a representation of the aircraft 100 with wingtips 102 in a folded position. Each wing 104 of the aircraft 100 includes a primary portion 106 coupled to a fuselage 108 of the aircraft 100 and the wingtip 102. Folding wingtip systems of the aircraft 100 are able to rotate the wingtips 102 from the flight position to the folded position and vice versa. In an implementation, a horizontal length of the wingtip 102 from a wingtip end to a hinge axis is about eleven feet. In other implementations, the horizontal length of the wingtip 102 may be shorter or longer. In some implementations, ends of the wingtip 102 may include winglets.

Sensor data associated with one or more components of the folding wingtip systems are processed by a wingtip extension anomaly detector 110 to determine if the folding wingtip systems operated correctly to position the wingtips 102 in an appropriate position (e.g., the folded position or the flight position). In FIGS. 1A and 1B, the wingtip extension anomaly detector 110 is illustrated using dashed lines to indicate that it is not typically visible from an exterior of the aircraft 100. Examples of operation of the wingtip extension anomaly detector 110 are described below with reference to FIGS. 2-7.

FIG. 2 depicts a block diagram of an aircraft 100. The aircraft 100 includes the wings 104, a flight control computer 202; input devices 204 (e.g., a steering yoke, sidestick, levers, buttons, dials, keyboards, touchscreens, etc.) to receive data, commands, and other information from flight crew members and external sources; output devices 206 (e.g., displays, gauges, speakers, headphones, haptic devices, etc.) to provide information about operating conditions associated with the aircraft 100 to flight crew members and external sources; engines 208 to provide power to the aircraft 100, operation systems 210; a sensor system 212 to enable the flight control computer 202, the operation systems 210, or both, to determine the operating conditions associated with the aircraft 100; and other components. Each wing 104 includes the primary portion 106 and the wingtip 102 that is configured to rotate relative to the primary portion 106 about a hinge axis 214.

The flight control computer 202 controls operation of the aircraft 100 based on input received from crew members and from external sources, and based on use conditions. The flight control computer 202 includes one or more processors 216 and a memory 218. The memory 218 stores data 220 associated with operation of the aircraft 100 and instructions 222 executable by the processor 216 to perform operations. The instructions 222 may include flight instructions 224 to operate the aircraft 100, warning systems 226 to provide indications should one or more abnormal conditions occur, a maintenance scheduler 228 to schedule maintenance of the aircraft 100, a wingtip extension anomaly detector 110A, other applications, or combinations thereof. Maintenance scheduled by the maintenance scheduler 228 may include routine maintenance, particular maintenance to address a problem detected by the flight control computer 202, or combinations thereof.

The operation systems 210 are configured to implement control commands sent by the flight control computer 202, provided by crew members via the input devices 204, or both. The operation systems 210 include folding wingtip systems 230, a navigation system, a communication system, and other systems utilized during use of the aircraft 100. Each folding wingtip system 230 is associated with a wing 104 and configured to rotate a wingtip 102 of the wing 104 relative to the primary portions 106 of the wing from a folded position to a flight position and vice versa. Each folding wingtip system 230 is also configured to secure the wingtip 102 in the flight position and the folded position.

Use of the folding wingtip system 230 is controlled by the flight instructions 224. The flight instructions 224 include logic that determines when the folding wingtip system 230 is usable. For example, flight instructions 224 prohibit the flight control computer 202 from sending a fold command to fold the wingtips 102 from the flight position to the folded position when the aircraft 100 is in a takeoff phase or a flight phase and prevents the flight control computer 202 from sending the fold command during a landing phase until the aircraft 100 is on the ground and is traveling at a speed below a threshold speed. The threshold speed is below a speed needed for the aircraft 100 to resume flight. In some implementations, the threshold speed is a taxi speed. As another example, the flight instructions 224 prohibit the flight control computer 202 from sending an extend command to extend the wingtips 102 from the folded position to the flight position based on a comparison of a current location of the aircraft 100 to wingspan limit data for an airport where the aircraft 100 is located when the aircraft 100 is not in flight and is in a taxi-in phase, taxi-out phase, or located at a stand (e.g., a gate).

The wingtip extension anomaly detector 110A can represent a portion of the wingtip extension anomaly detector 110 that is implemented at the flight control computer 202 and that operates based on input from the sensor system 212, the folding wingtip systems 230, or both. The wingtip extension anomaly detector 110A receives notification signals regarding operation of the folding wingtip systems 230 in response to commands sent from the flight control computer 202 to the folding wingtip systems 230. When a received notification signal includes one or more error codes, the wingtip extension anomaly detector 110A is configured to change a setting to indicate that the aircraft 100 is grounded, is configured to provide information to the warning systems 226 to enable crew notification of one or more problems with the folding wingtip systems 230 and notification that the aircraft is grounded, and is configured to provide the one or more error codes to the maintenance scheduler 228 so that particular maintenance to address the one or more problems can be performed.

The flight control computer 202 may determine that last completed commands by the folding wingtip systems 230 were fold commands. The determination may be made when the aircraft 100 transitions from an idle or low power state to a powered state, periodically, when the flight control computer 202 determines to implement one or more extend commands to move the wingtips 102 from folded positions to flight positions, or combinations thereof. For example, before the one or more extend commands are sent to the folding wingtip systems 230, the wingtip extension anomaly detector 110A sends a request for position of the wingtips 102 to the folding wingtip systems 230 and determines a last implemented command of the folding wingtip systems 230 from the data 220. When the response to the requests for wingtip positions indicates the wingtips 102 are in the folded positions and the last implemented commands of the folding wingtip systems 230 were fold commands, the wingtip extension anomaly detector 110A determines there is no anomaly and sends the one or more extend commands to the folding wingtip systems 230.

When the wingtip extension anomaly detector 110A determines that one or both of the wingtips 102 are not in the folded position and last implemented commands by the folding wingtip systems were fold commands, the wingtip extension anomaly detector 110A determines that there is an anomaly. The wingtip extension anomaly detector 110A sets a setting that grounds the aircraft 100 and sets error codes associated with the anomaly. The error codes include one or more codes used by the maintenance scheduler 228 to specify particular maintenance to be performed to place the aircraft 100 back in service. The error codes includes codes indicating problems with a brake system (e.g., brake system 308 of FIG. 3) configured to maintain the wingtip 102 in the folded position and prevent unintentional movement of the wingtip 102 from the folded position, error codes associated with a wingtip actuation system of the folding wingtip systems 230 (e.g., wingtip actuation system 304 of FIG. 3), and error codes associated with a position of a wingtip 102 that is not in the folded position. For example, if one of the wingtips 102 is in a position at or near to the flight position, the error codes associated with the position of the wingtip 102 enable the maintenance scheduler 228 to specify particular maintenance (e.g., wingtip-to-stop drop maintenance) that addresses problems associated with the wingtip 102 falling from the folded position to the flight position.

Figure 3:
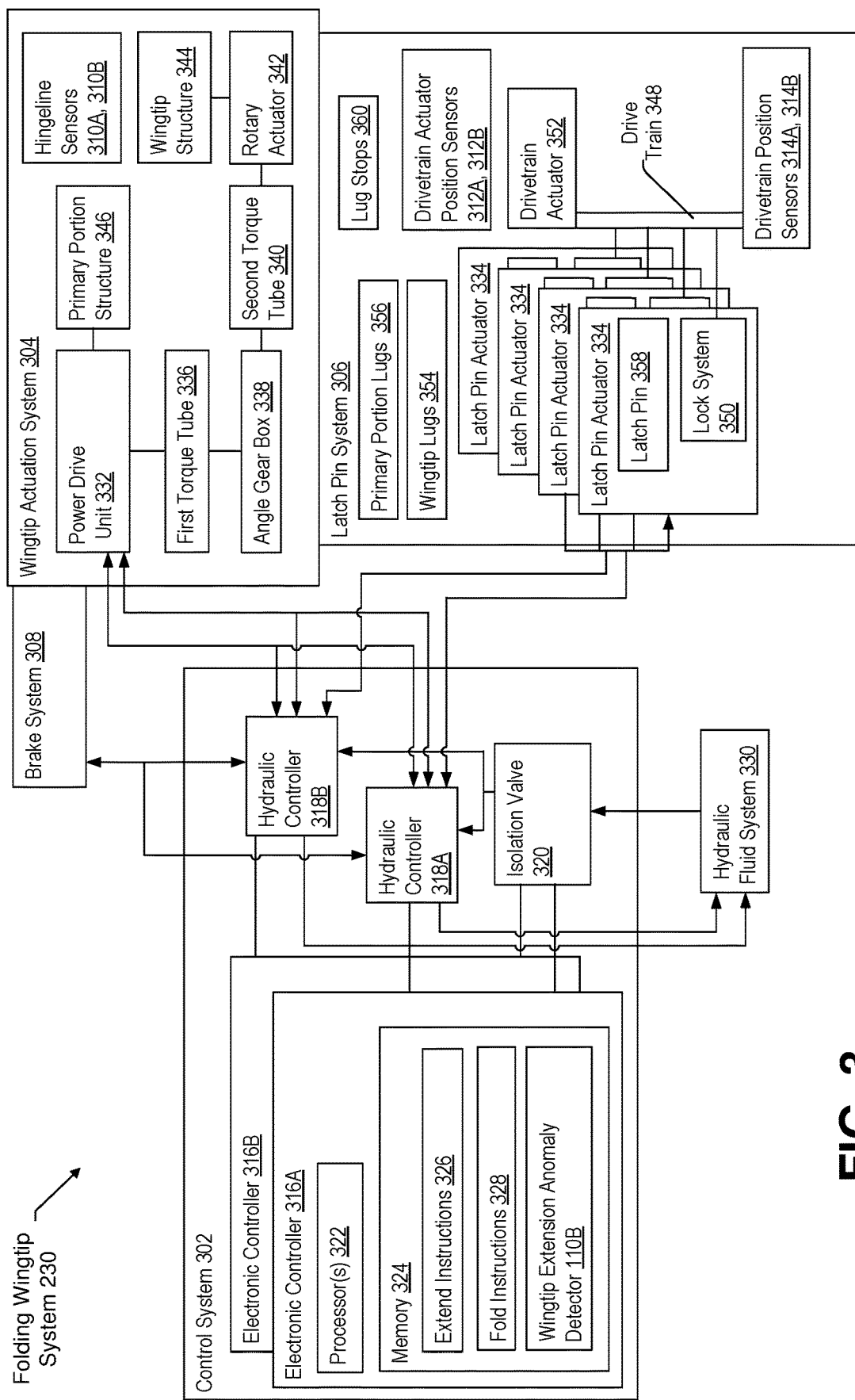
FIG. 3 is a diagram of a folding wingtip system of a folding wingtip aircraft that includes a wingtip extension anomaly detector.

FIG. 3 is a block diagram of the folding wingtip system 230 for a wing 104 of the aircraft 100. The folding wingtip system 230 includes a control system 302, a wingtip actuation system 304 to rotate the wingtip 102 between the folded position and the flight position, a latch pin system 306 to lock the wingtip 102 in the flight position, a brake system 308 to lock the wingtip 102 in the folded position, a portion of the sensor system 212 (e.g., hingeline sensors 310, drivetrain actuator position sensors 312, and drivetrain position sensors 314), other components, or combinations thereof.

The control system 302 includes an electronic controller 316A, a hydraulic controller 318A coupled to the electronic controller 316A, a redundant electronic controller 316B, a redundant hydraulic controller 318B coupled to the electronic controller 310B, and an isolation valve 320 communicatively coupled to the electronic controllers 316. The electronic controllers 316 are communicatively coupled to the flight control computer 202.

In some implementations, the electronic controllers 316A, 316B are shared by the folding wingtip system 230 of the other wing 104 of the aircraft 100 to enable simultaneous control of both folding wingtip systems 230 via one of the electronic controllers 310A, 310B in response to a command received from the flight control computer 202. Sharing the electronic controllers 316A. 316B by the folding wingtip systems 230 enables the folding wingtip aircraft 100 to have two electronic controllers 316A, 316B instead of four electronic controllers 316A, 316B as when each folding wingtip system 230 includes its own electronic controllers 316A, 316B. Similarly, in some implementations, the hydraulic controllers 318A, 318B are shared by the folding wingtip system 230 of the other wing 104 of the aircraft 100. Spacing and system weight considerations of components and connection systems (e.g., wiring for electronic controllers 316 and hydraulic lines for hydraulic controllers 318) may be considerations during a design phase of the aircraft 100 used in determining whether to use two electronic controllers 316A, 316B or four electronic controllers 316A, 316B and whether to use two hydraulic controllers 318A, 318B or four hydraulic controllers 318A, 318B.

Each electronic controller 316 includes one or more processors 322 and a memory 324. The memory 324 is configured to store data and instructions. The instructions include extend instructions 326, fold instructions 328, and a wingtip extension anomaly detector 110B. When a particular electronic controller 316 receives an extend command from the flight control computer 202, the one or more processors 322 execute the extend instructions 326 to implement a procedure that causes the folding wingtip system 230 to rotate the wingtip 102 from the folded position to the flight position and secure the wingtip 102 in the flight position. When the particular electronic controller 316 receives a fold command from the flight control computer 202, the one or more processors 322 execute the fold instructions 328 to implement a procedure that causes the folding wingtip system 230 to rotate the wingtip 102 from the flight position to the folded position and secure the wingtip 102 in the folded position.

The wingtip extension anomaly detector 110B can represent a portion of the wingtip extension anomaly detector 110 that is implemented at the electronic controllers 316 and that monitors execution of a particular command received from the flight control computer 202 via the extend instructions 326 or the fold instructions 328. When the command implements correctly, the wingtip extension anomaly detector 110B provides a notification to the wingtip extension anomaly detector 110A of the flight control computer 202 that indicates successful implementation of the received command. When the wingtip extension anomaly detector 110B detects, based on sensor data, that implementation of the received command stops before completion, the wingtip extension anomaly detector 110B stops further implementations of instructions (e.g., the extend instructions 326 or the fold instructions 328), closes the isolation valve 320, sets one or more error codes associated with the folding wingtip system 230, sends a notification signal including the one or more error codes to the wingtip extension anomaly detector 110A, or combinations thereof.

Each electronic controller 316 is communicatively coupled to a corresponding hydraulic controller 318. Each hydraulic controller 318 is coupled by a hydraulic supply line to the isolation valve 320 to receive pressurized hydraulic fluid from a hydraulic fluid system 330. The hydraulic fluid system 330 may be a centralized system that supplies hydraulic fluid to the folding wingtip system 230 of each wing 104 of the aircraft 100. Each hydraulic controller 318 is coupled to a return hydraulic line that directs return hydraulic fluid to the hydraulic fluid system 330. The hydraulic controllers 318 include a number of ports. Supply hydraulic lines and return hydraulic lines are connected to the ports and hydraulic units of the folding wingtip system 230 (e.g., a power drive unit 332, latch pin actuators 334, the brake system 308, etc.). When an electronic controller 316 is implementing a first command (e.g., the extend command or the fold command), the electronic controller 316 sends an open signal to the isolation valve 320, and sends various signals to the corresponding hydraulic controller 318 during implementation of the first command to cause the hydraulic controller 318 to direct pressurized hydraulic fluid to appropriate hydraulic units at appropriate times and to stop supplying hydraulic fluid to particular units at particular times. A last, or near to last signal, sent by the electronic controller 316 during implementation of the first command is a close signal to close the isolation valve 320, which stops the folding wingtip system 230 from functioning, until one of the electronic controllers 316 receive a second command signal (e.g., the fold command or the extend command) from the flight control computer 202 to use the folding wingtip system 230 and the electronic controller 316 sends a signal to open the isolation valve 320 as part of a procedure to implement the second command.

The isolation valve 320 is associated with a first valve coil controlled by the first electronic controller 316A to open and close the isolation valve 320, a second valve coil controlled by the second electronic controller 316B to open and close the isolation valve 320, and one or more valve sensors for each valve sensor configured to monitor operation of the valve coils. Data from the valve sensors is used by the electronic controllers 316 to determine if an open valve command or a close valve command was implemented. When a particular electronic controller 316 implements a particular command (i.e., a valve open command or a valve close command) and valve sensor data indicates that the particular command was not completed, a first isolation valve error code associated with the particular controller is set and the particular electronic controller 316 causes the particular command to be implemented by the other electronic controller 316. When the valve sensor data indicates that the particular command was completed by the other electronic controller 316, a notification signal sent to the flight control computer 202 includes the first isolation valve error code. Presence of the first isolation valve error code in the notification signal without presence of a second isolation valve error code associated with the other electronic controller 316 allows the flight control computer 202 to keep the aircraft in service and schedule maintenance of the aircraft 100 to address issues with the particular electronic controller 316, the valve sensor associated with the particular electronic controller 316, or both.

When valve sensor data indicates that the particular command was also not completed by the other electronic controller 316, the second isolation valve error code associated with the other electronic controller is set, and a notification signal is sent to the flight control computer 202 that includes the first isolation valve error code and the second isolation valve error code. The flight control computer 202, in response to the presence of the first isolation valve error code and the second isolation valve error code in the notification signal, causes to change a setting to indicate that the aircraft 100 is grounded and causes maintenance to be scheduled to address one or more problems associated with the valve sensors, the isolation valve 320, or both.

The wingtip actuation system 304 includes the power drive unit 332 that rotates a first torque tube 336, an angle gear box 338 driven by the first torque tube 336, a second torque tube 340 driven by the angle gear box 338, and a rotary fold actuator 342 that is driven by the second torque tube 340. The rotary fold actuator 342 is aligned on the hinge axis 214 and is coupled to wingtip structure 344. Rotation of the second torque tube 340 causes rotation of the rotary fold actuator 342 about the hinge axis 214, which causes rotation of the wingtip 102 about the hinge axis 214. The power drive unit 332 is coupled to primary portion structure 346 of the primary portion 106 of the wing 104. The power drive unit 332 may be a hydraulic unit with a first unit configured to rotate the first torque tube 336 in a first direction that results in rotation of the wingtip 102 by the rotary fold actuator 342 about the hinge axis 214 toward the flight position and a second unit configured to rotate the first torque tube 336 in a second direction that results in rotation of the wingtip 102 by the rotary fold actuator 342 about the hinge axis 214 in a second direction toward the folded position. The first unit and the second unit of the power drive unit 332 are each connected to the hydraulic controllers 318 by a supply hydraulic line and a return hydraulic line.

The latch pin system 306 includes a plurality of latch pin actuators 334, a drivetrain 348 coupled to drive shafts of lock systems 350 of the latch pin actuators 334, a drivetrain actuator 352 configured to rotate the drivetrain 348, a plurality of wingtip lugs 354 structurally coupled to the wingtip structure 344 such that rotation of the rotary fold actuator 342 about the hinge axis 214 rotates the plurality of wingtip lugs 354, and a plurality of primary portion lugs 356 that are part of the primary portion structure 346. The lugs 354, 356 include support structure with an opening that is sized to receive a latch pin 358 of the latch pin actuators 334 when the openings are aligned and the wingtip 102 is in the flight position.

The latch pin actuators 334 are coupled to the primary portion structure 346 in working relation to the openings in the primary portion lugs 356. The latch pin actuators may be, or may be similar to, the latch pin actuators shown and described in U.S. Pat. No. 5,427,329. FIG. 3 depicts four latch pin actuators 334. In other implementations, each folding wingtip system 230 may include a different number of latch pin actuators 334. Each latch pin actuator 334 may be a hydraulic unit configured to extend the latch pin 358 of the latch pin actuator 334 through the openings of the lugs 354, 356 associated with the latch pin actuator 334 to secure the wingtip 102 in the flight position. Each latch pin actuator 334 is also configured to retract the latch pin 358 from the openings of the lugs 354, 356 to allow the wingtip actuation system 304 to rotate the wingtip 102 to the folded position.

Each latch pin actuator 334 includes a first hydraulic fluid port, a second hydraulic fluid port, the latch pin 358, and the lock system 350. When hydraulic fluid is supplied to the first hydraulic fluid ports of the latch pin actuators 334 through a first hydraulic line by one of the hydraulic controllers 318, the hydraulic fluid fills and expands first chambers of the latch pin actuators 334 to cause the latch pins 358 to extend from housings of the latch pin actuators 334. Expansion of the first chambers causes reduction of second chambers of the latch pin actuators 334. Hydraulic fluid from the second chambers flows through the second hydraulic ports and a second hydraulic line to the hydraulic controller 318. When hydraulic fluid is supplied to the second hydraulic fluid ports through the second hydraulic line by one of the hydraulic controllers 318, the hydraulic fluid fills and expands the second chambers of the latch pin actuators 334 to cause the latch pins 358 to retract into the housings. Expansion of the second chambers causes reduction of the first chambers. Hydraulic fluid from the first chambers flows through the first hydraulic ports and the first hydraulic line to the hydraulic controller 318.

The drivetrain actuator 352 is configured to rotate the drivetrain 348 in a first direction to a locked position to cause the lock systems 350 to place locking members in positions that inhibit retraction of the latch pins 358 of the latch pin actuators 334, and is configured to rotate the drivetrain 348 in a second direction to an unlocked position to cause the lock systems 350 to move the locking members to positions that allow the latch pins 358 to retract into the housings of the latch pin actuators 334. The drivetrain actuator 352 can be a hydraulic unit or an electrically driven unit.

During implementation of a command received from the flight control computer 202 by one of the electronic controllers 316 to use the folding wingtip system 230, the electronic controller 316 implements the extend instructions 326 or the fold instructions 328 depending on the command. Implementation of the instructions 326 or the instructions 328 causes the electronic controller 316 to send signals to use the latch pin system 306. The signals includes signals to the drivetrain actuator 352 that causes the drivetrain actuator 352 to be idle, to rotate the drivetrain 348 to the unlocked position, or to rotate the drivetrain 348 to the locked position. The wingtip extension anomaly detector 110B receives sensor data from the corresponding drivetrain actuator position sensor 312 and the corresponding drivetrain position sensor 314. The wingtip extension anomaly detector 110B analyzes the sensor data, and if the analysis indicates that the latch pin system 306 did not function correctly, the wingtip extension anomaly detector 110B stops implementation of the procedure, sets one or more error codes, and sends a notification signal to the flight control computer 202 that indicates failure of the command. The notification signal includes the one or more error codes. In response to the notification signal, the flight control computer 202 may change a setting to indicate that the aircraft 100 is grounded and may schedule maintenance for the aircraft 100 based on the one or more error codes.

For example, if the electronic controller 316A sent a signal to the drivetrain actuator 352 to cause the drivetrain actuator 352 to rotate the drivetrain 348 to a locked position and data from the drivetrain actuator position sensor 312A indicates that the drivetrain 348 is idle and data from the drivetrain position sensor 314A associated with the electronic controller 316A indicates that the drivetrain 348 is not in the locked position, the notification signal sent to the flight control computer 202 by the wingtip extension anomaly detector 110B includes one or more first error codes (e.g., one or more numbers, one or more characters, or both) that causes the maintenance scheduled for the aircraft 100 to include drivetrain actuator maintenance. As another example, if the electronic controller 316A sent a signal to the drivetrain actuator 352 to cause the drivetrain actuator 352 to rotate the drivetrain 348 to the unlocked position and data from the drivetrain actuator position sensor 312A indicates that the drivetrain 348 is set to rotate the drivetrain 348 to the unlocked position, but data from the drivetrain position sensor 314A indicates that the drivetrain 348 is not in the unlocked position after passage of a threshold time, the notification signal includes one or more second error codes that cause the maintenance scheduled for the aircraft 100 to include latch pin actuator maintenance to identify one or more latch pin actuators 334 that are not functioning correctly.

The brake system 308 secures the wingtip 102 in the folded position. In some implementations, the brake system 308 is a hydraulic unit coupled to an output of the power drive unit 332. The brake system 308 includes a torque limiter and a clutch. When the brake system 308 is in a locked configuration, no hydraulic fluid is supplied to the brake system 308 and the torque limiter is biased against the output of the power drive unit 332 to secure the wingtip 102 in place and prevent movement of the wingtip 102. When hydraulic fluid is supplied to the brake system 308, the brake system 308 transitions to an unlocked configuration. The hydraulic fluid activates the clutch to disengage the torque limiter and allow rotation of the first torque tube 336 by the power drive unit 332 to rotate the wingtip 102.

During use of the aircraft 100, the flight control computer 202 is configured to send a fold command to the electronic controller(s) 316 associated with folding wingtip systems 230 to cause the wingtips 102 of the aircraft 100 to rotate from the flight position to the folded position. The fold command may be sent automatically based on one or more conditions associated with operation of the aircraft 100 (e.g., a taxi-in flight phase after landing and a speed less than a threshold speed) or may be sent in response to crew member input that does not violate one or more conditions associated with use of the folding wingtip systems 230 to move the wingtips 102 from the flight position to the folded position. If the crew member input violates one or more conditions associated with use of the folding wingtip system 230, the warning system 226 provides indication of any violations and the flight control computer 202 does not send the fold command to one of the electronic controllers 316.

When the electronic controller 316 associated with the wingtip 102 receives the fold command, the electronic controller 316 sends an open signal to the isolation valve 320. The electronic controller 316 sends a plurality of signals to the drivetrain actuator 352 and to the hydraulic controller 318 associated with the electronic controller 316 to cause the latch pins 358 of the latch pin actuators 334 to be retracted from the primary portion lugs 356 and the wingtip lugs 354. When sensor data received from the drivetrain actuator position sensor 312 and the drivetrain position sensor 314 associated with the electronic controller 316 indicate that the latch pins 358 are retracted, the electronic controller 316 sends a signal to the brake system 308 that causes the brake system 308 to change from a locked configuration to an unlocked configuration and sends signals to the hydraulic controller 318 that cause the hydraulic controller 318 to activate the wingtip actuation system 304 to rotate the wingtip 102 to the folded position. When the electronic controller determines that data from the hingeline sensor 310 indicates that the wingtip 102 is in the folded position, the electronic controller 316 sends a signal to stop operation of the drivetrain actuator 352 to rotate the drivetrain 348, and a plurality of signals to the hydraulic controller 318 that cause the brake system 308 to change from the unlocked configuration to the locked configuration to lock the wingtip 102 in the folded position, stop operation of the power drive unit 332, and stop supply of hydraulic fluid to the latch pin actuators 334 that maintain the latch pins 358 in the retracted position. The wingtip extension anomaly detector 110B sends a notification signal to the flight control computer 202 indicating completion of the fold command. A close signal is sent to the isolation valve 320.

If the wingtip extension anomaly detector 110B determines that the fold command did not complete during implementation of the fold instructions 328, the wingtip extension anomaly detector 110B stops further implementation of the fold instructions 328 and sends a notification signal to the flight control computer 202 indicating failure of the fold command. The notification signal includes one or more error codes usable by the maintenance scheduler 228 to schedule particular maintenance to address a probable cause of failure of the folding wingtip system 230 and to fix the folding wingtip system 230 so that the aircraft 100 is flightworthy.

For example, if the wingtip extension anomaly detector 110B detects, based on data from the hingeline sensor 310 associated with the electronic controller 116, that the wingtip 102 initially moved from the flight position toward the folded position and then moved back toward the flight position, the wingtip extension anomaly detector 110B stops further implementation of the fold instructions 328 and the notification signal sent to the flight control computer 202 includes error codes indicating a fall of the wingtip 102. The error codes include one or more first codes that cause the aircraft 100 to be scheduled for maintenance of the wingtip actuation system 304 to identify and fix one or more portions of the wingtip actuation system 304 that failed and allowed the wingtip 102 to fall (e.g., the first torque tube 336, the second torque tube 340, etc.), and one or more second codes based on a position of the wingtip 102.

If the position of the wingtip 102 is at or near the flight position, the one or more second codes includes one or more particular codes that instructs the flight control computer 202 to schedule the aircraft for wingtip-to-stop drop maintenance. Wingtip-to-stop drop maintenance includes instructions to remove the wingtip lugs 354 and lug stops 360 of the primary portion 106 that limit the rotational range of the wingtip 102, and replace the removed wingtip lugs 354 and lug stops 360. A first set of the removed wingtip lugs 354 with visible damage (e.g., warping, cracks, etc.) are identified as scrap. A second set of the removed wingtip lugs 354 without visible damage are subjected to testing (e.g., x-ray imaging, sonic imaging, or other non-destructive testing method) to determine if the wingtip lugs 354 sustained non-visible damage. Wingtip lugs 354 that have non-visible damage are identified as scrap and, in some implementations, wingtip lugs 354 that do not have visible or non-visible damage can be reused.

If the position of the wingtip 102 is in a latch pin interference range, the one or more second codes include one or more codes that instructs the flight control computer 202 to schedule the aircraft 100 for wingtip-to-latch pin drop maintenance. The latch pin interference range corresponds to an angle range of the wingtip 102 relative to the primary portion as indicated by data from the hingeline sensor 310 where one or more wingtip lugs 354 could be in contact with one or more latch pins 358 of the latch pin actuators 334. The latch pin interference range may be a narrow range (e.g., 14 degrees to 15 degrees or some other range) for latch pin systems 306 where central axes of the latch pins 358 are aligned relative to the hinge axis 214 and may be a broad range (e.g., 10 degrees to 20 degrees or some other range) for latch pin systems 306 where central axes of one or more latch pins 358 are not aligned relative to the hinge axis 214. Central axes of the one or more latch pins 358 may not be aligned relative to the hinge axis 214 due to spacing limitations in the wing 104, to be able to determine one or more particular latch pins 358 contacted by one or more wingtip lugs 354 based on an angle of the wingtip 102, or both.

Wingtip-to-latch pin drop maintenance includes instructions to identify one or more particular latch pins 358 that were contacted by one or more particular wingtip lugs 354 and replace each of the one or more particular latch pins 358 with a replacement latch pin 358. Replacing a latch pin 358 may entail removing the latch pin 358 from the latch pin actuator 334 and replacing the latch pin 358 with the replacement latch pin 358, or replacing the latch pin actuator 334 with another latch pin actuator 334. A first subset of contacted latch pins 358 with visible damage (e.g., dents or cracks) are identified as scrap. A second subset of contacted latch pins 358 that do not include visible damage are subjected to testing to determine if there is non-visible damage. Based on the testing, and in some implementations, contacted latch pins 358 without visible damage and non-visible damage can be reused, and contacted latch pins 358 with visible damage or non-visible damage are identified as scrap.

Also, the wingtip-to-latch pin drop maintenance includes instructions to identify one or more particular wingtip lugs 354 that contacted a latch pin 358 and replace each of the one or more particular wingtip lugs 354 with a replacement wingtip lug 354. A first subset of wingtip lugs 354 that contacted a latch pin 358 and include visible damage are identified as scrap. A second subset of wingtip lugs 354 that contacted a latch pin 358 that do not include visible damage are subjected to testing to determine if there is non-visible damage. Based on the testing, and in some implementations, wingtip lugs 354 without visible damage and non-visible damage can be reused, and wingtip lugs 354 with visible damage or non-visible damage are identified as scrap.

During use of the aircraft 100, the flight control computer 202 is configured to send an extend command to the electronic controller(s) 316 associated with folding wingtip systems 230 to cause the wingtips 102 of the aircraft 100 to move from the folded position to the flight position. The flight control computer 202 may send the extend command automatically based on occurrence of one or more conditions (e.g., a location of the aircraft 100 is in an area where having the wingtips 102 in the flight position is allowed and a flight phase of the aircraft 100 is taxi-out or taxi-in, etc.), or in response to crew input that will not violate one or more conditions that prohibit having the wingtips 102 in the flight position if implemented.

Before sending the extend command, the wingtip extension anomaly detector 110A of the flight control computer 202, based on data received from one or more of the electronic controllers 316 that indicates the positions of the wingtips 102, determines whether the folding wingtip systems 230 are functional. When the wingtip extension anomaly detector 110A determines that the folding wingtip systems 230 are functional, the wingtip extension anomaly detector 110A sends the extend commands to the one or more controllers 316.

In response to the extend command, the electronic controller 316 implements the extend instructions 326 and sends an open signal to the isolation valve 320. The electronic controller 316 sends a plurality of signals to the drivetrain actuator 352, to the hydraulic controller 318 associated with the electronic controller 316, and to the latch pin system 306 to cause the latch pins 358 of the latch pin actuators 334 to be retracted so that the wingtip lugs 354 can rotate into position relative to the primary portion lugs 356 without contact with any of the latch pins 358. When sensor data received from the drivetrain actuator position sensor 312 and the drivetrain position sensor 314 associated with the electronic controller 316 indicate that the latch pins 358 are retracted, the electronic controller 316 sends a signal that causes the brake system 308 to change from a locked configuration to an unlocked configuration and sends signals to the hydraulic controller 318 that cause the hydraulic controller 318 to activate the wingtip actuation system 304 to rotate the wingtip 102 to the flight position. When the electronic controller 316 determines that data from the hingeline sensor 310 indicates that the wingtip 102 is in the flight position, the electronic controller 316 sends a signal to the drivetrain actuator 352 to cause the drivetrain actuator 352 to rotate the drivetrain 348 toward the locked position, and a plurality of signals to the hydraulic controller 318 that cause the latch pin actuators 334 to extend the latch pins 358 through the openings of the primary portion lugs 356 and the wingtip lugs 354, stop operation of the power drive unit 332, and change the brake system 308 from the unlocked configuration to the locked configuration. When data from the drivetrain position sensor 314 indicates that the lock system 350 are fully locked, the wingtip extension anomaly detector 110B 316 sends a notification signal to the flight control computer 202 indicating completion of the extend command. The close signal is sent to the isolation valve 320.

If the wingtip extension anomaly detector 110B determines that the extend command stops before completion, the wingtip extension anomaly detector 110B stops further implementation of the extend instructions 326 and sends the notification signal to the flight control computer 202 to indicate failure of the extend command. The notification signal includes one or more error codes usable by the maintenance scheduler 228 to schedule particular maintenance to address a probable cause of failure of the extend command and to repair the aircraft 100.

For example, if the wingtip extension anomaly detector 110B detects, based on data from the hingeline sensor 310 associated with the electronic controller 116, that the wingtip 102 initially moved from the folded position toward the flight position and stopped before reaching the flight position, the wingtip extension anomaly detector 110B stops further implementation of the extend instructions 328 and sends the notification signal to the flight control computer 202 with one or more particular error codes. The one or more particular error codes are dependent on the angle of the wingtip 102 relative to the primary portion 106. If the angle of the wingtip 102 is not in the latch pin interference range, the one or more particular error signals include one or more first error codes that cause the flight control computer 202 to schedule the aircraft 100 for maintenance that includes examination of the components of the wingtip actuation system 304 to determine why motion of the wingtip 102 stopped and to fix the wingtip actuation system 304. If the angle of the wingtip 102 is in the latch pin interference range, the one or more particular error codes include one or more second error codes that cause the flight control computer 202 to schedule the aircraft 100 for maintenance that includes determining if one or more wingtip lugs 354 contacted corresponding latch pins 358, and if there was contact, performing wingtip-to-latch pin drop maintenance. The one or more second error codes also include one or more error codes that cause, if there was not contact of one or more wingtip lugs 354 with corresponding latch pins 358, the maintenance to a determination of why motion of the wingtip 102 stopped and to repair the wingtip actuation system 304.

As another example, if the wingtip extension anomaly detector 110B determines that the wingtip 102 arrived at the flight position, or near to the flight position, in a time quicker than a threshold time, the notification signal sent to the flight control computer 202 includes one or more third error codes indicating that there was a wingtip-to-stop drop. The flight control computer 202 changes a particular setting to indicate that the aircraft 100 is grounded and schedules maintenance for the aircraft 100 including wingtip-to-stop drop and wingtip actuation system maintenance to fix the wingtip actuation system based on the one or more third error codes.

Figure 4:
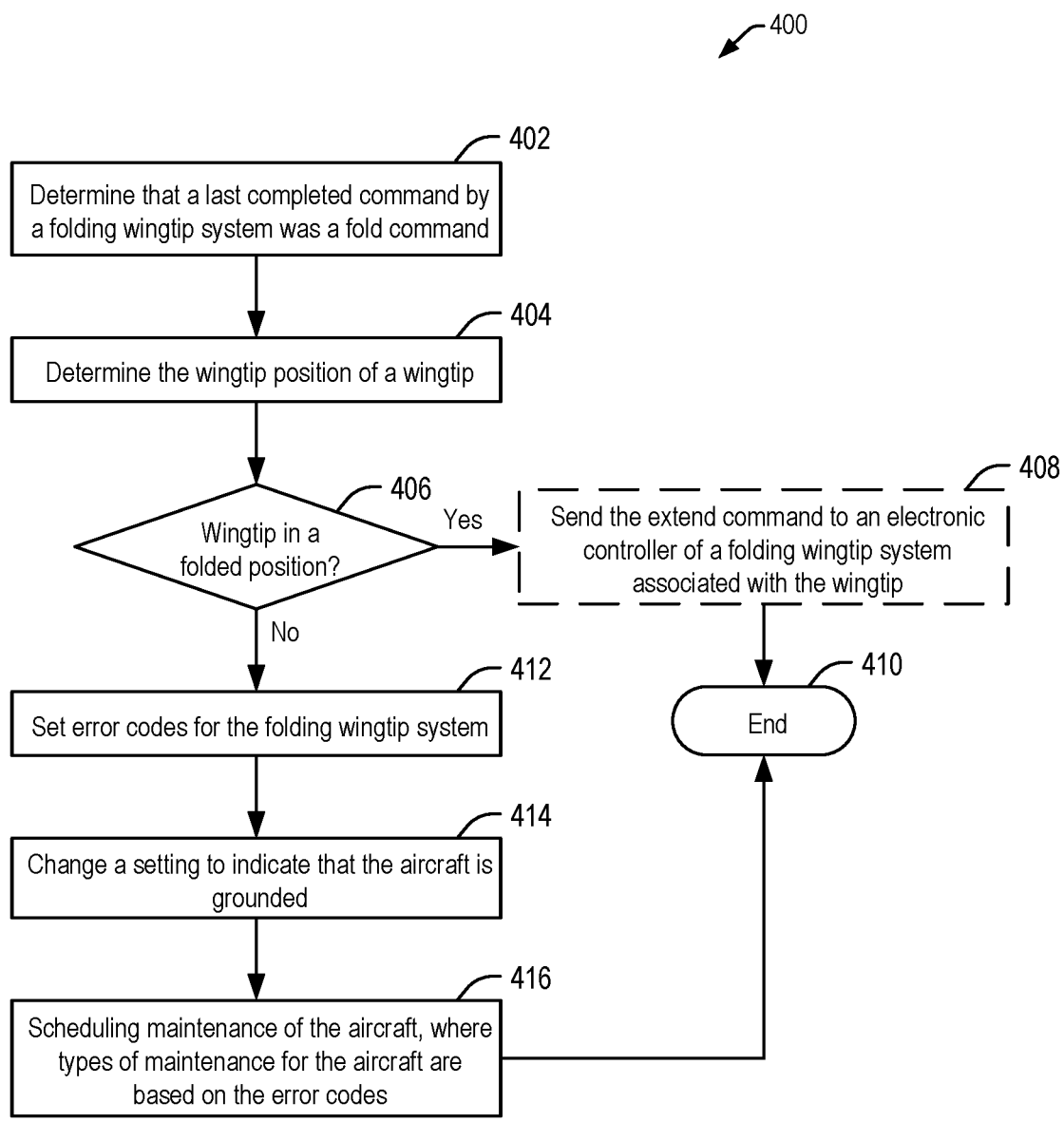
FIG. 4 is a flow chart of an implementation of a first method of use of a folding wingtip system of an aircraft including wingtip extension anomaly detection.

FIG. 4 depicts a flow chart of an implementation of a first method 400 of use of a folding wingtip system 230. The method 400 may be performed by the flight control computer 202, including the maintenance scheduler 228 and the wingtip extension anomaly detector 110A. The method 400, at block 402 includes determining that a last completed command by the folding wingtip system 230 was a fold command. The determination may include a check that last implemented commands by the folding wingtip systems 230 were fold commands based on the data 220 stored in the memory 218 of the flight control computer 202. The determination is made when the aircraft 100 transitions from an idle or unpowered state to a powered state and the determination can be made periodically when the aircraft 100 is powered by the engines 208 of the aircraft 100 or by a connection to an external power source.

The determination can also be made in response to a determination to send an extend command to use the folding wingtip system 230 to move the wingtip 102 from the folded position to the flight position. Determining to use the folding wingtip system 230 may be performed automatically based on conditions of use of the aircraft 100 determined by the flight control computer 202 based on sensor data from the sensor systems 212 (e.g., the aircraft 100 is in a taxi out phase and is not in a section of an airport where having the wingtips 102 in the flight position is prohibited), based on input received from a crew member to implement an extend command that will not violate one or more conditions associated with changing to the flight position, or combinations thereof. If input from the crew member would violate the one or more conditions, the warning systems 226 provide output that informs the crew member of a problem associated with the extend command and the flight control computer 202 does not cause implementation of the extend command.

The method 400, at block 404, includes determining the wingtip position of the wingtip 102. Determining the wingtip position may include sending a position request to the folding wingtip system 230 and receiving position data from a hingeline sensor 310. The position data corresponds to an angle of the wingtip 102 relative to the primary portion 106 of the wing 104.

The method 400, at decision block 406, determines if the wingtip position is in the folded position. When the determination, at decision block 406, is that the wingtip 102 is in the folded position and the method 400 is implemented based on a determination to send the extend command to the folding wingtip system 230, the method 400, at optional block 408, includes sending the extend command to an electronic controller 316 of the folding wingtip system 230 associated with the wingtip 102, and the method 400 ends at block 410. When the determination, at decision block 406, is that the wingtip 102 is in the folded position and the method is not implemented based on a determination to send the extend command to the folding wingtip system 230, the method 400 ends at block 410.

When the determination, at decision block 406, is that the wingtip 102 is not in the folded position, the method 400 includes, at block 412 setting error codes for the folding wingtip system 230. The error codes include an error code associated with failure of the brake system 308 and an error code associated with failure of the wingtip actuation system 304. The error code associated with failure of the brake system 308 causes the maintenance scheduler 228 of the flight control computer 202 to schedule brake system maintenance to determine why the brake system 308 failed and to repair the brake system 308. The error code associated with failure of the wingtip actuation system 304 causes the maintenance scheduler 228 to schedule wingtip actuation system maintenance to determine which component(s) of the wingtip actuation system 304 failed such that the wingtip 102 was able to fall and to fix the wingtip actuation system 304.

The error codes also include one or more additional error codes dependent on the angle of the wingtip 102 determined based on the position data. For example, if the angle of the wingtip 102 is in the latch pin interference range, the error codes include one or more additional error codes that indicate that the wingtip 102 fell and may have contacted a latch pin 358, and the maintenance is to include wingtip-to-latch pin drop maintenance; and if the wingtip is at the flight position, or substantially at the flight position (e.g., within 1 degree, 2 degrees, or some other small number of degrees of the flight position), the error codes include one or more additional error codes that indicate that the wingtip 102 fell and the maintenance is to include wingtip-to-stop drop maintenance.

The method 400, at block 414, includes changing a setting to indicate that the aircraft 100 is grounded. The setting prevents the flight control computer 202 from allowing the aircraft 100 to fly. The method 400, at block 416, also includes scheduling maintenance of the aircraft 100. The types of maintenance scheduled for the aircraft are based on the error codes. The method 400 then ends at 410.

Figure 5:
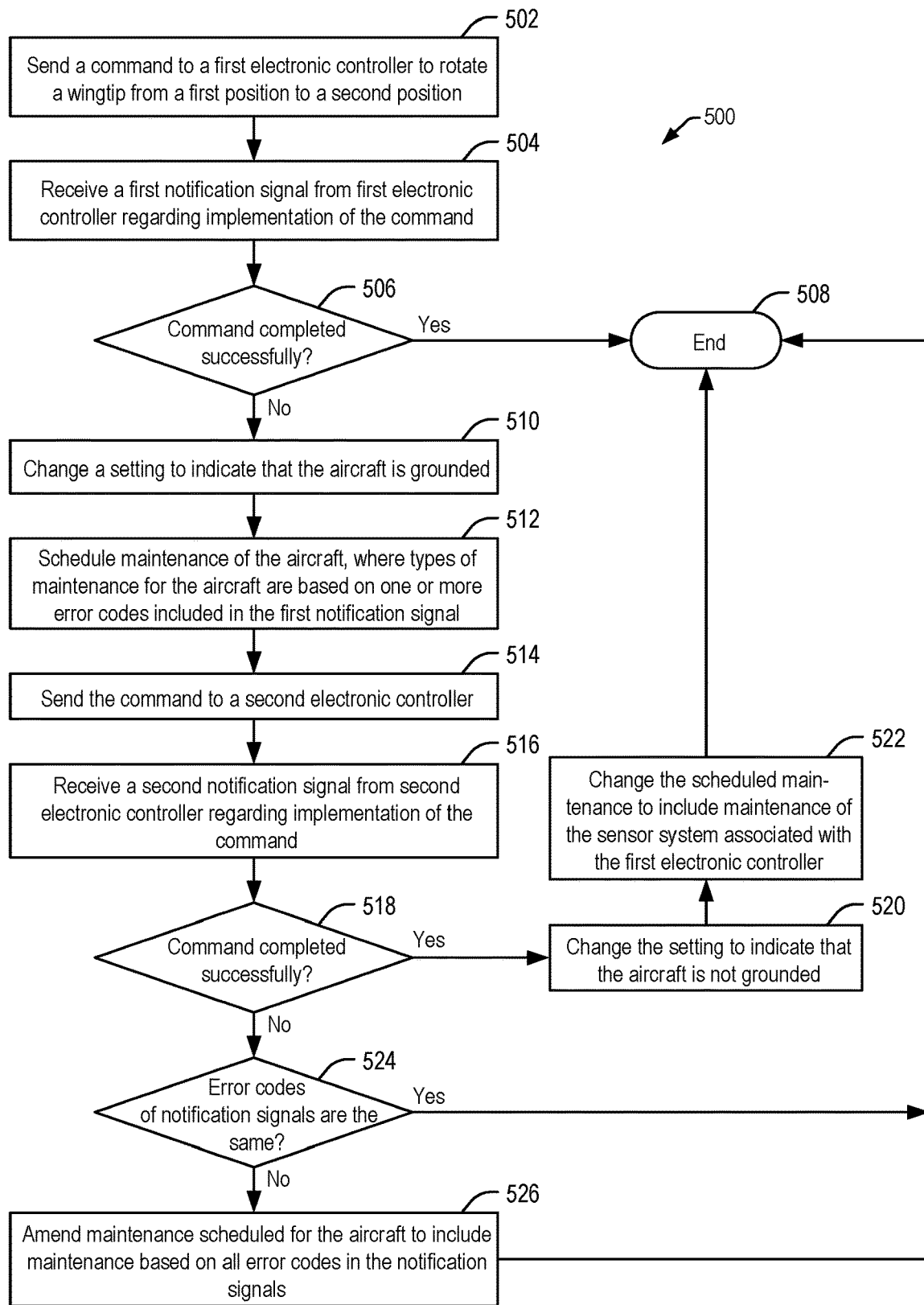
FIG. 5 is a flow chart of an implementation of a second method of use of a folding wingtip system of an aircraft including wingtip extension anomaly detection.

FIG. 5 depicts a flow chart of an implementation of a second method 500 of use of a folding wingtip system 230. The method 500 may be performed by the flight control computer 202. The method 500, at block 502 includes sending a command to a first electronic controller 316A of a folding wingtip system 230 to move a wingtip 102 from a first position to a second position. The command may be a fold command to move the wingtip 102 from a flight position to a folded position, or the command may be an extend command to move the wingtip 102 from the folded position to the flight position.

The method 500, at block 504, includes receiving a first notification signal from the first electronic controller 316A regarding implementation of the command. The method 500, at decision block 506, includes determining if the command completed successfully based on content of the notification. When the determination at decision block 506 is that the command completed successfully, the method 500 ends at block 508. When the determination at decision block 506 is that the command did not complete successfully, the method 500, at block 510 includes changing a setting to indicate that the aircraft 100 is grounded. The method 500, at block 512, includes scheduling maintenance of the aircraft 100, where the type of maintenance is based on one or more error codes included in the first notification signal.

When the determination at decision block 506 indicates that the command did not complete successfully, there is a possibility that the problem with the folding wingtip system 230 is a problem with one or more sensors associated with the first electronic controller 316A and not with the mechanics of the folding wingtip system 230. The redundant control system 316B of the folding wingtip system 230 can be used to determine if the problem with the folding wingtip system 230 is a problem with one or more of the sensors associated with the first electronic controller 316A. If the problem is a problem with the one or more sensors, the aircraft 100 does not need to be grounded for maintenance, but maintenance can be scheduled for the sensors associated with the electronic controller 316A at a convenient time and the aircraft 100 may be used for one or more additional flights.

In conjunction with determining whether the command did not complete successfully due to one or more sensors associated with the first electronic controller 316A, the method 500, at block 514, includes sending the command to the second electronic controller 316B. The method 500, at block 516, includes receiving a second notification signal from the second controller 316B regarding implementation of the command.

The method 500, at decision block 518, includes determining if the command completed successfully based on content of the second notification. When the determination at decision block 518 is that the command completed successfully, the method 500, at block 520, includes changing the setting to indicate that the aircraft 100 is not grounded. The method 500, at block 522, includes changing the scheduled maintenance to include maintenance of the sensor system associated with the first electronic controller 316A. The method 500 then ends at 508.

When the determination at decision block 518 is that the command did not complete successfully, the method 500, at decision block 524 includes determining if the error codes of the notification signals are the same. When the determination, at decision block 518, is that the notification signals include the same error codes, the method 500 ends at 508. When the determination, at decision block 524, is that the notification signals include different error codes, the method 500, at block 526, includes amending the maintenance scheduled for the aircraft to include maintenance based on all error codes in the notification signals. The method 500 then ends at 508.

Figure 6:
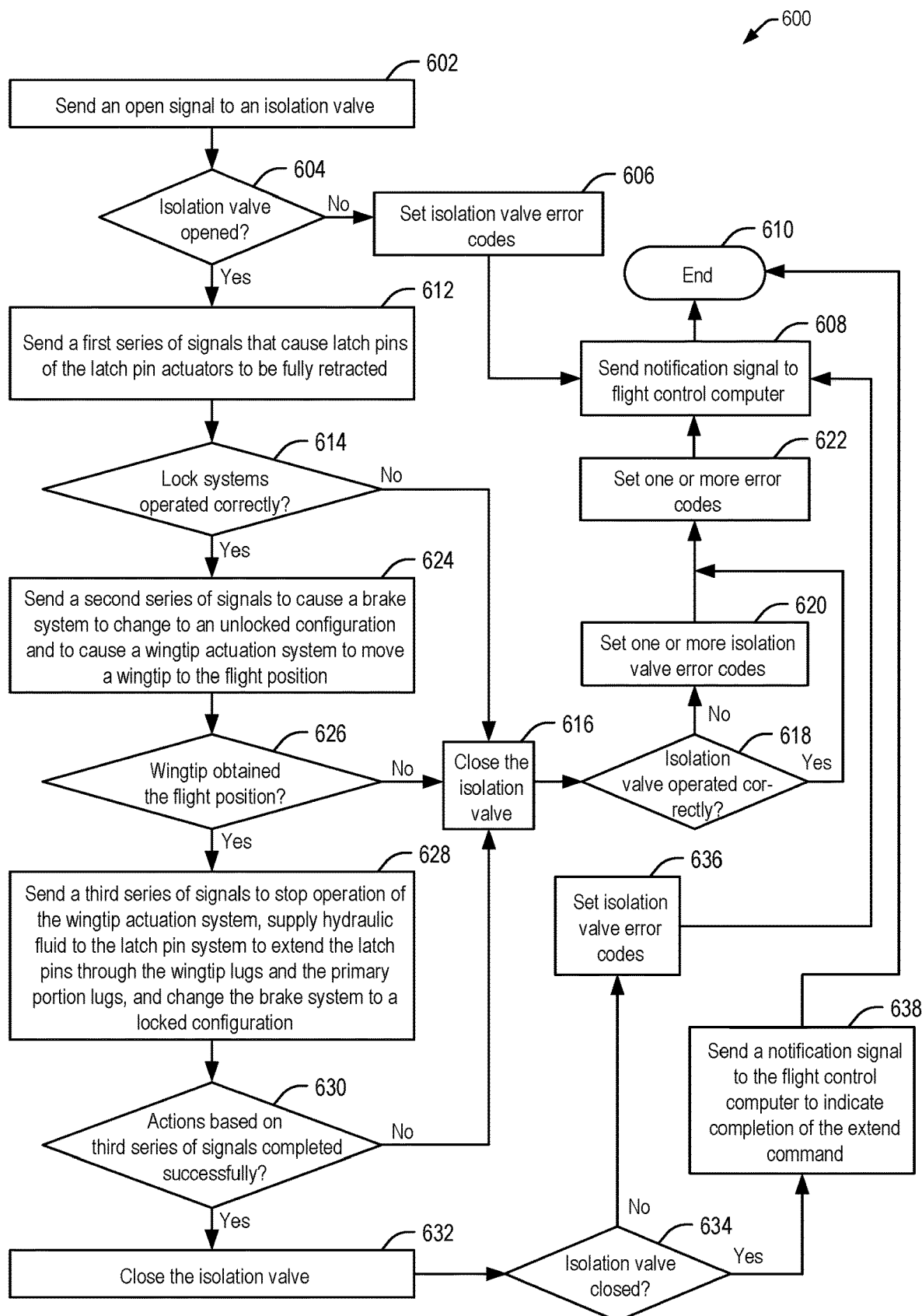
FIG. 6 is a flow chart of an implementation of a third method of use of a folding wingtip system of an aircraft including wingtip extension anomaly detection.

FIG. 6 depicts a flow chart of an implementation of a third method 600 of use of a folding wingtip system 230 to implement an extend command. The method 600 may be used to change a position of the wingtip 102 from the folded position to the flight position. The method 600 may be performed by one of the electronic controllers 316 in response to receipt of the extend command from the flight control computer 202 and the method 600 includes the use of the extend instructions 326 and the wingtip extension anomaly detector 110B. The method 600, at block 602 includes sending an open signal to the isolation valve 320. Opening the isolation valve enables hydraulic powered components of the folding wingtip system 230 to function when supplied with hydraulic fluid from the hydraulic controller 318 associated with the electronic controller 316.

The method 600, at decision block 604, determines if the isolation valve 320 opened. The determination is based on data from valve sensors. When the determination at decision block 604 is that the isolation valve did not open, the method 600, at block 606 includes setting isolation valve error codes. The method 600, at block 608, includes sending a notification signal to the flight control computer 202. The notification signal includes the isolation valve error codes, which cause the aircraft 100 to be grounded and cause maintenance to be scheduled for the aircraft 100 to fix one or more problems associated with the isolation valve, the valve sensors, or both. The method 600 ends at 610.

When the determination at decision block 604 is that the isolation valve 320 opened, the method 600, at block 612, includes sending a first series of signals that cause the latch pins 358 of the latch pin actuators 334 to be fully retracted. The first signals may include signals to the hydraulic controller 318 to cause supply of hydraulic fluid to the latch pin system 306 and signals to the drivetrain actuator 352 to cause rotation of the drivetrain 348.

The method 600, at decision block 614, determines if the lock systems 350 of latch pin actuators 334 operated correctly. The determination may be based on sensor data from the drivetrain actuator position sensor 312 and the drivetrain position sensor 314. When the determination at decision block 614 is that the lock systems 350 did not operate correctly, the method 600, at block 616, includes closing the isolation valve 320 by sending a close signal to the isolation valve 320.

The method 600, at decision block 618, determines if the isolation valve 320 operated correctly to close the isolation valve 320. When the determination at decision block 618 is that the isolation valve 320 did not operate correctly, the method, at block 620, includes setting one or more isolation valve error codes. The method 600, at block 622, includes setting one or more error codes. Also, when the determination at decision block 618 is that the isolation valve operated correctly to shut the isolation valve 320, the method 600 moves to block 622 and sets the one or more error codes. The error codes may indicate that one or more of the lock systems 350 did not function correctly. The method 600 proceeds to block 608 to send the notification signal to the flight control computer 202. The notification signal includes the error codes, any isolation valve error codes, and indicates failure of the extend command. The method 600 then ends at block 610.

When the determination at decision block 614 is that the lock systems 350 operated correctly, the method 600, at block 624, includes sending a second series of signals to cause the brake system 308 to change from a locked configuration to an unlocked configuration and to cause activation of the wingtip actuation system 304 to move the wingtip 102 from the folded position to the flight position.

The method 600, at decision block 626, determines if the wingtip 102 obtained the flight position. The determination may be based on hingeline sensor data from the hingeline sensor 310 that indicates the angle of the wingtip 102 relative to the primary portion 106 of the wing 104.

When the determination at decision block 626 is that the wingtip 102 did not obtain the flight position, the method 600 proceeds to block 616 and then to decision block 618. The method 600 returns to block 622 to set one or more error codes after implementing decision block 618 or decision block 618 and block 620. The one or more error codes may include particular error code based on analysis of the hingeline sensor data, clock data, or both. If the hingeline sensor data indicates that the wingtip 102 did not move from the folded position, particular error codes indicating problems associated with the brake system 308 and the wingtip actuation system 304 are set.

If the hingeline sensor data indicates that the wingtip 102 stopped at a position outside of a latch pin interference range, particular error codes that indicate problems associated with the wingtip actuation system 304 are set. If the hingeline sensor data indicates that the wingtip 102 stopped in the latch pin interference range, particular error codes that indicate occurrence of wingtip-to-latch pin drop are set. The particular error codes enable scheduled maintenance to determine, and address problems that could have occurred, if the wingtip 102 stopped in the latch pin interference range due to failure of the wingtip actuation system 304 without contact with one or more of the latch pins 358, if the wingtip actuation system 304 failed and allowed the wingtip lugs 354 to fall and contact one or more of the latch pins 358, or if the wingtip actuation system 304 did not fail and one or more of the wingtip lugs 354 were driven against one or more of the latch pins 358 by the wingtip actuation system 304.

If the clock data indicates that the wingtip obtained a position at or near the flight position too quickly (e.g., faster than a threshold time), the particular error codes indicate occurrence of wingtip-to-stop drop. The error codes enable scheduled maintenance to address problems with the wingtip actuation system 304 that allowed the wingtip 102 to fall and to address damage that might have occurred due to the wingtip 102 falling.

When the determination at decision block 626 is that the wingtip 102 did obtain the flight position, the method 600, at block 628, includes sending a third series of signals to stop operation of the wingtip actuation system 304, supply hydraulic fluid to the latch pin actuators 334 to extend the latch pins 358 through the wingtip lugs 354 and the primary portion lugs, and change the brake system 308 to a locked configuration. When the latch pins 358 are extended through the wingtip lugs and the primary portion lugs, the wingtip is secured to the primary portion 106 and the aircraft 100 is configured for flight.

The method 600, at decision block 630, includes determining if actions based on the third series of signals completed successfully. When the determination, at block 630, is that the actions based on the third series of signals did not complete successfully, the method 600 proceeds to block 616 and then to decision block 618. The method 600 proceeds from decision block 618, or from decision block 618 and block 620, to block 622 to set one or more error codes. For example, if data from the drivetrain position sensor 314 indicates that the drivetrain 348 did not obtain the fully locked position, the one more error signals include particular error codes to indicate failure of the lock systems 150, the drivetrain 348, or both.

When the determination, at decision block 630, is that the actions based on the third series of signals did complete successfully, the method 600, at block 632, includes closing the isolation valve 320. The method 600, at decision block 634, determines if the isolation valve closed. When the determination at decision block 634 is that the isolation valve 320 did not close, the method 600, at block 636, includes setting isolation valve error codes. The method proceeds to block 608 to send the notification signal to the flight control computer 202 and the method 600 ends at block 610. The notification signal indicates that the extend command failed and includes the isolation valve error codes. The flight control computer 202 grounds the aircraft 100 and scheduled appropriate maintenance to address issues with the isolation valve 320 responsive to the notification signal.

When the determination at decision block 634 is that the isolation valve 320 did close, the method 600, at block 638, includes sending a notification signal to the flight control computer 202 to indicate completion of the extend command. The method then ends at block 610. The notification signal sent to the flight control computer 202 at block 638 may include one or more isolation valve error codes that indicate an issue with one or more valve sensors if the open signal sent to the isolation valve 320 at block 602, the close signal sent to the isolation valve at block 632, or both were not implemented by the electronic controller 316 executing the extend instructions 326 but by the redundant electronic controller 316. In response to the presence of at least one isolation valve error code in the notification signal that indicates completion of the extend command, the flight control computer 202 schedules maintenance to address issues with the valve sensor.

Figure 7:
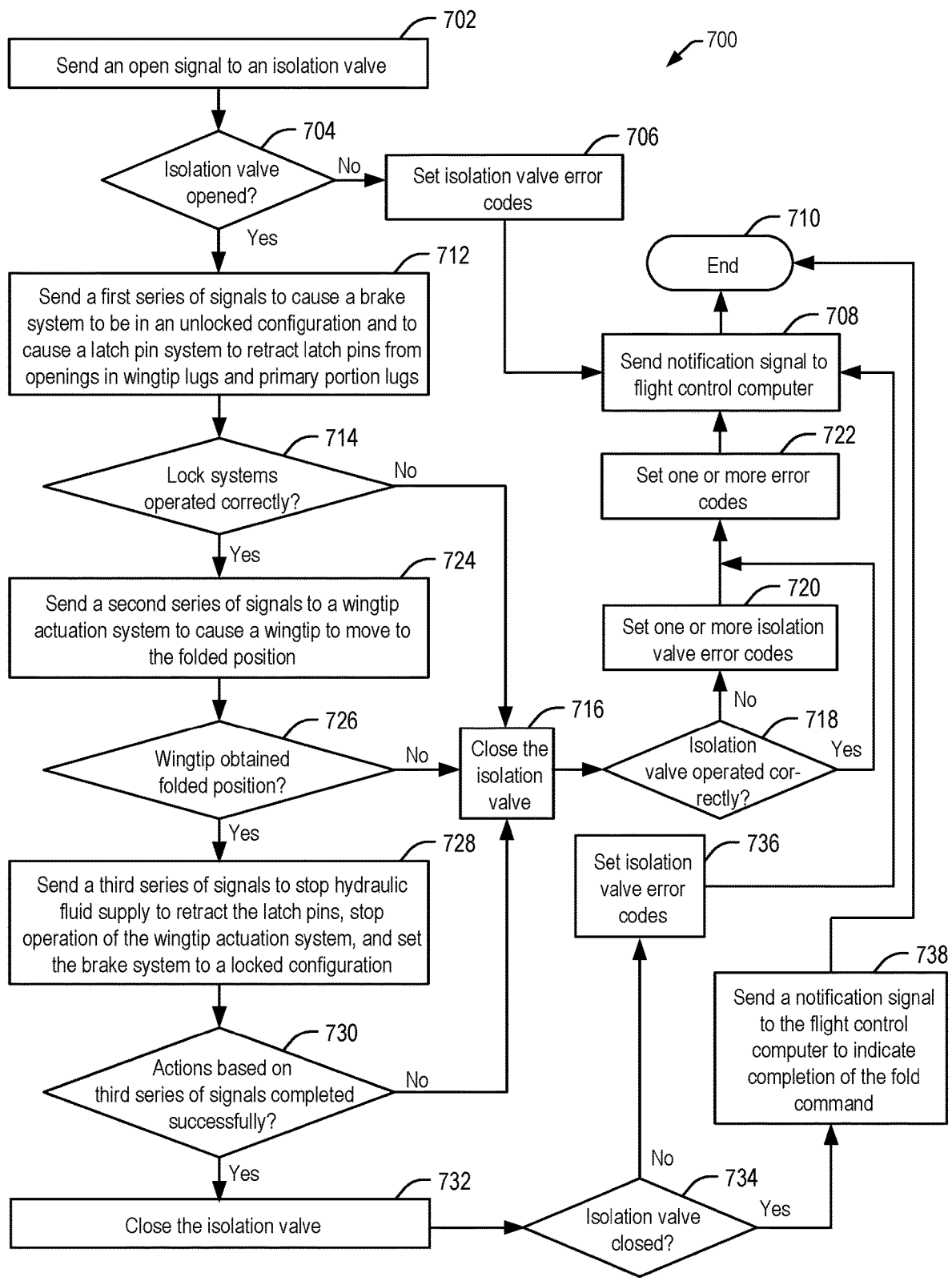
FIG. 7 is a flow chart of an implementation of a fourth method of use of a folding wingtip system of an aircraft including wingtip extension anomaly detection.

FIG. 7 depicts a flow chart of an implementation of a fourth method 700 of use of the folding wingtip system 230 to implement a fold command. The method 700 may be used to change a position of the wingtip 102 from the flight position to the folded position. The method 700 may be performed by one of the electronic controllers 316 in response to receipt of the fold command from the flight control computer 202 and the method 700 includes the use of the fold instructions 328 and the wingtip extension anomaly detector 110B. The method 700, at block 702 includes sending an open signal to the isolation valve 320.

The method 700, at decision block 704 determines if the isolation valve 320 opened. The determination is based on data from valve sensors. When the determination at decision block 704 is that the isolation valve did not open, the method 700, at block 706 includes setting isolation valve error codes. The method 700, at block 708 includes sending a notification signal to the flight control computer 202. The notification signal includes the isolation valve error codes, which cause the aircraft 100 to be grounded and cause maintenance to be scheduled for the aircraft 100 to fix one or more problems associated with the isolation valve, the valve sensors, or both. The method 700 ends at 710.

When the determination at decision block 704 is that the isolation valve opened, the method 700, at block 712, includes sending a first series of signals to cause the brake system 308 to be in the unlocked configuration and to cause the latch pin system 306 to retract the latch pins 358 from openings in the wingtip lugs 354 and openings in the primary portion lugs 356. The signals may include signals from the electronic controller 316 to the corresponding hydraulic controller 318 and signals to the drivetrain actuator 352 to rotate the drivetrain 348.

The method 700, at decision block 714, determines if lock systems 350 of the latch pin actuators 334 operated correctly. The determination may be based on sensor data from the drivetrain actuator position sensor 312 and the drivetrain position sensor 314. When the determination at decision block 714 is that the lock systems 350 did not operate correctly, the method 700, at block 716, includes closing the isolation valve 320.

The method 700, at decision block 718, determines if the isolation valve 320 operated correctly to close the isolation valve 320. When the determination at decision block 718 is that the isolation valve 320 did not operate correctly, the method, at block 720, includes setting one or more isolation valve error codes. The method 700, at block 722, includes setting one or more error codes. Also, when the determination at decision block 718 is that the isolation valve operated correctly to shut the isolation valve 320, the method 700 moves to block 722 and sets the one or more error codes. The error codes may indicate that one or more of the lock systems 350 did not function correctly. The method 700 proceeds to block 708 to send the notification signal to the flight control computer 202. The notification signal includes the error codes, any isolation valve error codes, and indicates failure of the fold command. The error codes inform the flight control computer 202 to ground the aircraft 100 and enable the flight control computer 202 to schedule appropriate maintenance for the aircraft 100 to allow the aircraft 100 to return to service. The method 700 ends at block 710.

When the determination at decision block 714 is that the lock systems 350 operated correctly, the method 700, at block 724, includes sending a second series of signals to the wingtip actuation system 304 to cause the wingtip 102 to move to the folded position. The method 700, at decision block 726, determines if the wingtip 102 obtained the folded position. The determination may be based on hingeline sensor data from the hingeline sensor 310 that indicates the angle of the wingtip 102 relative to the primary portion 106 of the wing 104.

When the determination at decision block 726 is that the wingtip 102 did not obtain the folded position, the method 700 proceeds to block 716 and then to decision block 718. The method 700 proceeds from decision block 718, or from block 718 and block 720, to block 722 to set one or more error codes. For example, one or more particular error codes may be based on analysis of the hingeline sensor data. If the hingeline sensor data indicates that the wingtip 102 did not rise, the particular error codes may include one or more error codes that indicate a problem with one or more of the torque tubes 336, 340 of the wingtip actuation system 304. If the hingeline sensor data indicates that the wingtip 102 initially rose and stopped at a particular angle, the particular error codes may be one or more error codes that indicate a problem with the power drive unit 332, the angle gear box 338, the rotary fold actuator 342, or combinations thereof. If the wingtip 102 initially rose and then fell back to, or near to, the flight position, the particular error codes may be error codes that indicate a problem with one or more of the torque tubes 336, 340 of the wingtip actuation system 304 and error codes that indicate that a wingtip-to-stop drop of the wingtip 102 occurred. If the wingtip 102 initially rose and then fell and stopped in the latch pin interference range, the particular error codes may be error codes that indicate a problem with torque tubes 336, 340 of the wingtip actuation system 304 and error codes that indicate that a wingtip-to-latch pin drop occurred. Additional error codes could be set based on the hingeline sensor data or other sensor data.

When the determination at decision block 726, indicates that the wingtip 102 obtained the folded position, the method 700, at block 728, includes sending a third series of signals to stop hydraulic fluid supply to retract the latch pins 358, stop operation of the wingtip actuation system 304, and set the brake system 308 to a locked configuration. The method 700 proceeds to decision block 730 to determine if actions implemented by the third set of signals completed successfully.

When the determination at decision block 730 is that the actions implemented by the third set of instructions did not complete successfully, the method 700 proceeds to block 716 and then to decision block 718. The method 700 proceeds from decision block 618, or from decision block and block 720, to block 722 to set one or more error codes after decision block 718. For example, if data from a brake system sensor indicates that the brake system 308 did not change to the locked configuration, a particular error code is set to indicate a problem with the brake system 308 or the brake system sensor.

When the determination at decision block 730 is that the actions based on the third series of signals completed successfully, the method 700, at block 732, includes closing the isolation valve 320. The method 700, at decision block 734, determines if the isolation valve 320 closed. When the determination at decision block 734 is that the isolation valve 320 did not close, the method 700, at block 736, includes setting isolation valve error codes. The method proceeds to block 708 to send the notification signal to the flight control computer 202, and the method 700 ends at 710. The notification signal indicates that the extend command failed and includes the isolation valve error codes. The flight control computer 202 grounds the aircraft 100 and scheduled appropriate maintenance to address issues with the isolation valve 320 responsive to the notification signal.

When the determination at decision block 734 is that the isolation valve 320 did close, the method 700, at block 738, includes sending a notification signal to the flight control computer 202 to indicate completion of the fold command. The method then ends at block 710. The notification signal sent to the flight control computer 202 at block 738 may include one or more isolation valve error codes that indicate an issue with one or more valve sensors if the open signal sent to the isolation valve 320 at block 702, the close signal sent to the isolation valve at block 732, or both were not implemented by the electronic controller 316 executing the fold instructions 328 but by the redundant electronic controller 316. In response to the presence of at least one isolation valve error code in the notification signal that indicates completion of the fold command, the flight control computer 202 schedules maintenance to address issues with the valve sensor.

Figure 8:
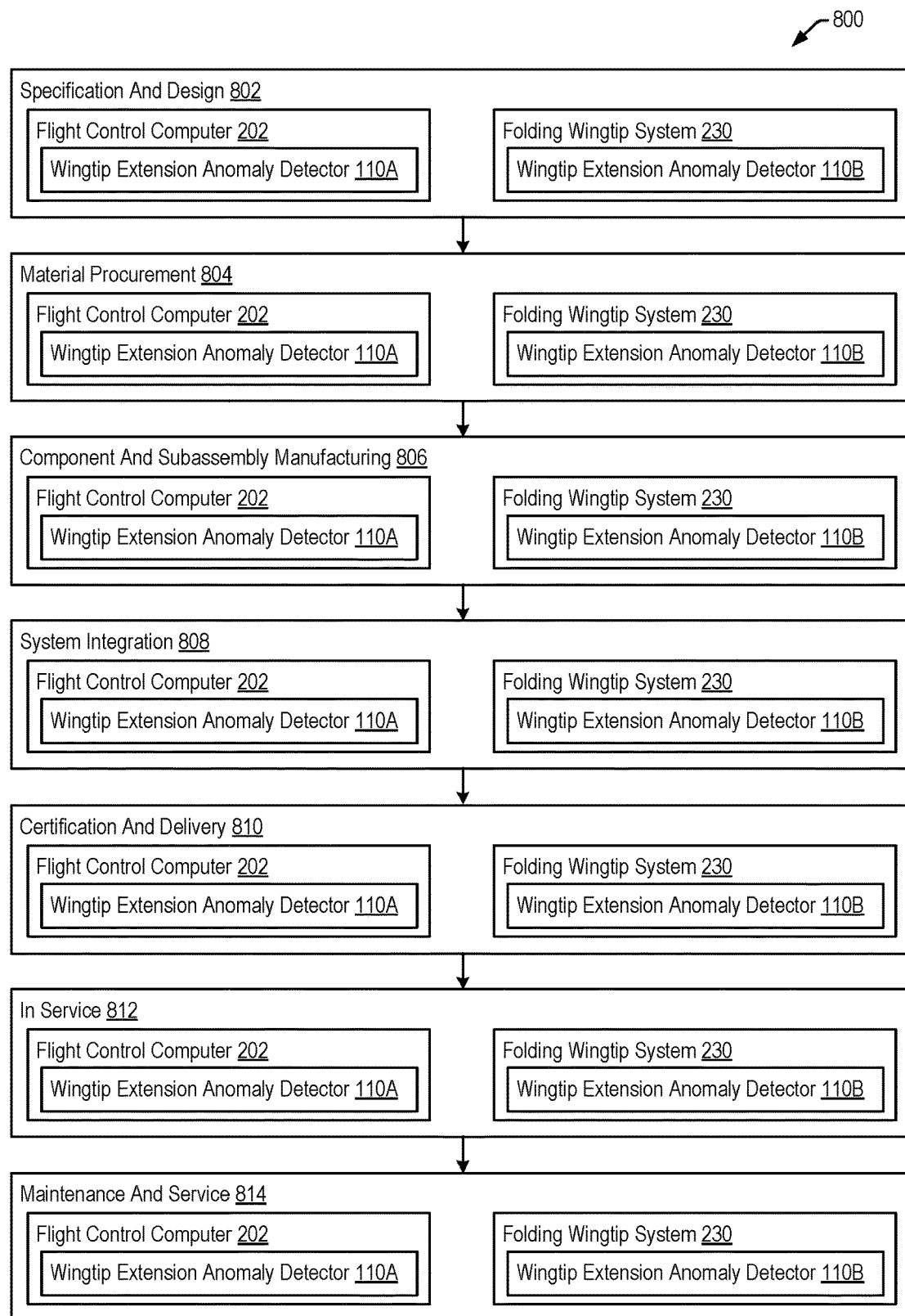
FIG. 8 is a flow chart illustrating a life cycle of an aircraft that includes the wingtip extension anomaly detector of FIG. 1A.

FIG. 8 is a flowchart illustrating a method 800 representing a life cycle of an aircraft that includes the flight control computer 202 with the wingtip extension anomaly detector 110A and the folding wingtip system 230 of FIG. 2. The folding wingtip system 230 includes (or is otherwise coupled to) the wingtip extension anomaly detector 110B. During pre-production, the exemplary method 800 includes, at block 802, specification and design of an aircraft, such as the aircraft 100 described with reference to FIGS. 1A-3. During specification and design of the aircraft, the method 800 may include specification and design of the flight control computer 202 and the folding wingtip system 230. At block 804, the method 800 includes material procurement, which may include procuring the flight control computer 202 and components of the folding wingtip system 230.

During production, the method 800 includes, at block 806, component and subassembly manufacturing and, at block 808, system integration of the aircraft. For example, the method 800 may include component and subassembly manufacturing of the flight control computer 202 and the folding wingtip system 230. At block 810, the method 800 includes certification and delivery of the aircraft and, at block 812, placing the aircraft in service. Certification and delivery may include certification of the flight control computer 202 and the folding wingtip system 230 to place the flight control computer 202 and the folding wingtip system 230 in service. While in service by a customer, the aircraft may be scheduled for routine maintenance and service (which may also include modification, reconfiguration, refurbishment, and so on). At block 814, the method 800 includes performing maintenance and service on the aircraft, which may include performing maintenance and service on the flight control computer 202 and the folding wingtip system 230.

Each of the processes of the method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of an aircraft. A particular example of the aircraft 100 of FIGS. 1A-3 is shown in FIG. 9.

Figure 9:
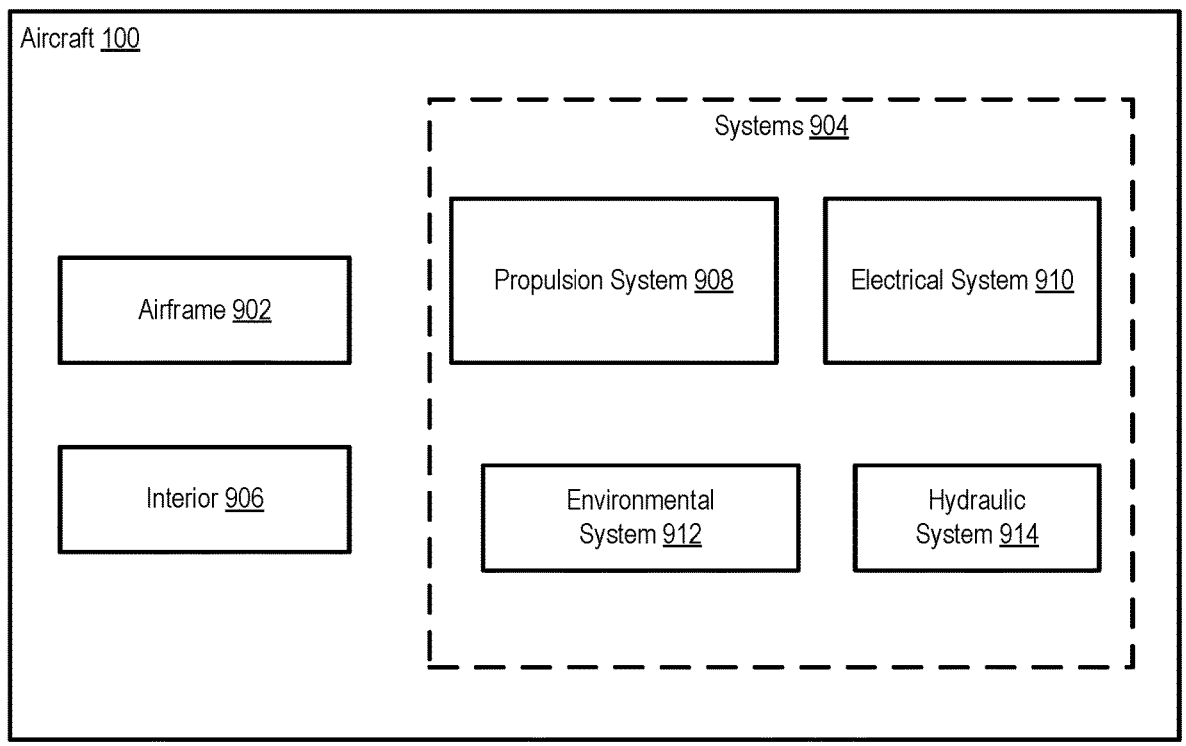
FIG. 9 is a block diagram of an aircraft.

In the example of FIG. 9, the aircraft 100 includes an airframe 902 with a plurality of systems 904 and an interior 906. Examples of the plurality of systems 904 include one or more of a propulsion system 908, an electrical system 910, an environmental system 912, and a hydraulic system 914. Any number of other systems may be included. In the example illustrated in FIG. 9, some components of the folding wingtip system 230 of FIG. 2 are included in the electrical system 910 and other components of the folding wingtip system 230 are included in the hydraulic system 914. The flight control computer 202 of FIG. 2 is included in the electrical system 910.

Figure 10:
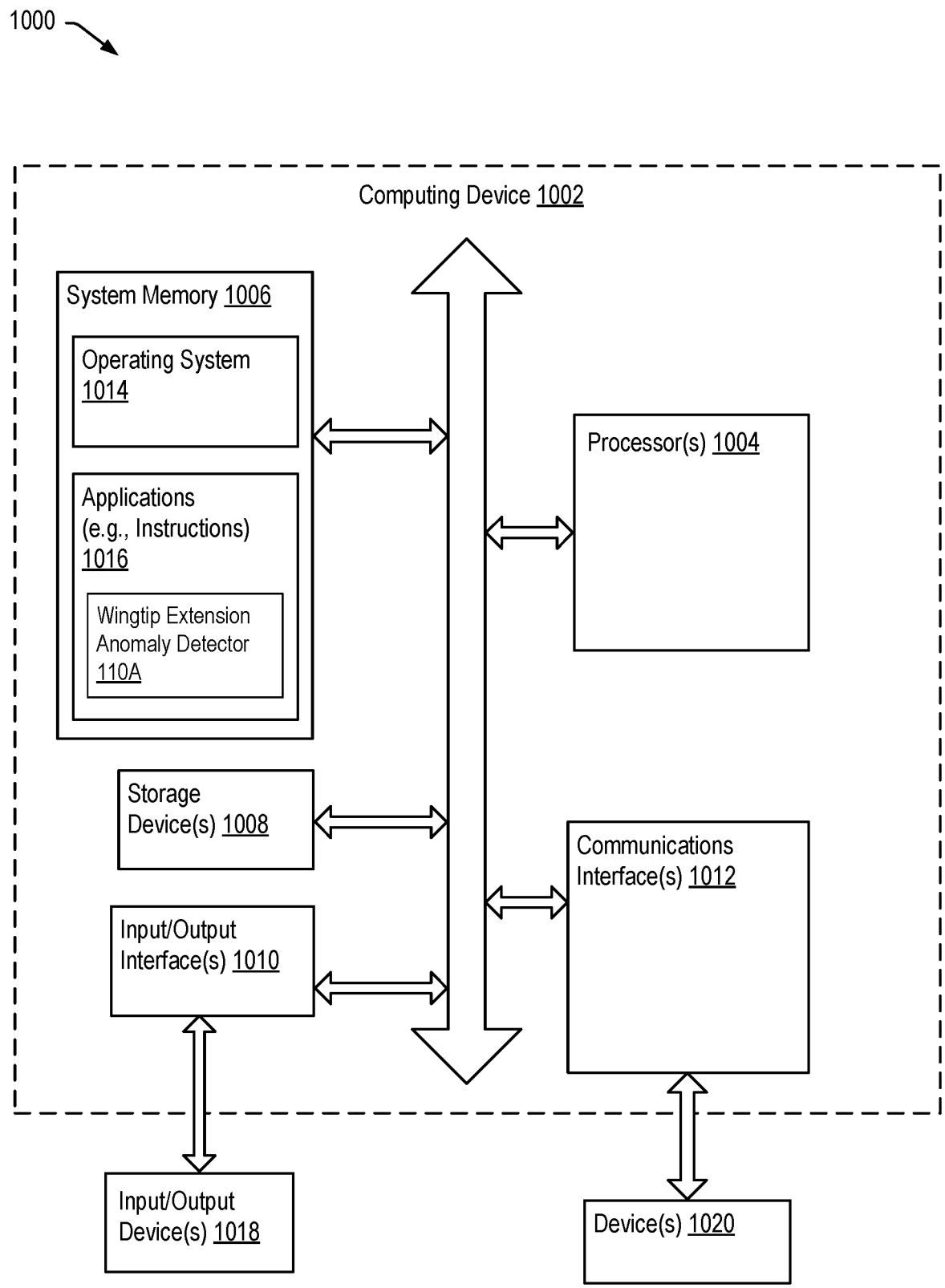
FIG. 10 is a block diagram of a computing environment including a computing device configured to support aspects of computer-implemented methods and computer-executable program instructions (or code) according to the present disclosure.

FIG. 10 is an illustration of a block diagram of a computing environment 1000 including a computing device 1002 configured to support implementations of computer-implemented methods and computer-executable program instructions (or code) according to the present disclosure. For example, the computing device 1002, or portions thereof, may execute instructions to perform, or cause equipment to perform, operations described with reference to FIGS. 2-9. In implementations, computing devices 1002 are, or are components of, the aircraft 100, the flight control computer 202, the folding wingtip system 230, and the electrical controllers 316 of FIGS. 1A-3.

The computing device 1002 includes one or more processors 1004. The processor 1004 communicates with a system memory 1006, one or more storage devices 1008, one or more input/output interfaces 1010, one or more communications interfaces 1012, or a combination thereof. The system memory 1006 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 1006 includes an operating system 1014, which may include a basic input/output system for booting the computing device 1002 as well as a full operating system to enable the computing device 1002 to interact with users, other programs, and other devices. The system memory 1006 includes one or more applications 1016 (e.g., instructions) which are executable by the processor 1004. For example, when the computing device 1002 is the flight control computer 202, the one or more applications 1016 include the flight instructions 224, warning systems 226, the maintenance scheduler 228, and the wingtip extension anomaly detector 110A; and when the computing device is the electronic controller 316, the one or more applications 1016 include the extend instructions 326, the fold instructions 328, and the wingtip extension anomaly detector 110B.

In some configurations, the processor 1004 communicates with the one or more storage devices 1008. For example, the storage device 1008 includes non-transitory computer readable media that can include nonvolatile storage devices, such as magnetic disks, optical disks, or flash memory devices. The storage devices 1008 can include both removable and non-removable memory devices. The storage devices 1008 can be configured to store an operating system, images of operating systems, applications, and program data. In particular implementations, the system memory 1006, the storage device 1008, or both, include tangible computer-readable media incorporated in hardware and which are not signals.

In some configurations, the processor 1004 communicates with the one or more input/output interfaces 1010 that enable the computing device 1002 to communicate with one or more input/output devices 1018 to facilitate user interaction. The input/output interfaces 1010 can include serial interfaces (e.g., universal serial bus (USB) interfaces or Institute of Electrical and Electronics Engineers (IEEE) interfaces), parallel interfaces, display adapters, audio adapters, and other interfaces ("IEEE" is a registered trademark of The Institute of Electrical and Electronics Engineers, Inc. of Piscataway, New Jersey). The input/output devices 1018 can include keyboards, pointing devices, displays (e.g., one or more monitors, one or more gauges, etc.), speakers, microphones, touch screens, rotatable selectors, levers, knobs, slides, switches, and other devices. The processor 1004 detects interaction events based on user input received via the input/output interfaces 1010. Additionally, the processor 1004 sends a display to a display device via the input/output interfaces 1010.

In some configurations, the processor 1004 can communicate with one or more devices 1020 via the one or more communications interfaces 1012. The one or more devices 1020 can include external computing devices contacted via a communication network and controllers, sensors, and other devices coupled to the computing device 1002 via wired or wireless local connections. For example, when the computing device 1002 is the electronic controller 316 of FIG. 3, the computer device 1002 is configured to communicate via the interface 1012 with the flight control computer 202 of FIG. 2 and with particular sensors of the folding wingtip system 230. The one or more communications interfaces 1012 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1A-10. In some implementations, part or all of one or more of the operations or methods associated with FIGS. 1A-10 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, an aircraft comprises: a wing, wherein the wing includes a primary portion and a wingtip; and a folding wingtip system configured to rotate the wingtip relative to the primary portion, wherein the folding wingtip system includes an electronic controller configured to: implement an extend command received from a flight control computer to rotate the wingtip from a folded position to a flight position; and in response to a determination that rotation of the wingtip stopped before the flight position during implementation of the extend command, send a first signal to the flight computer to cause the folding wingtip aircraft to be grounded and to schedule maintenance of the folding wingtip aircraft, wherein the first signal indicates that the maintenance includes wingtip-to-latch pin drop maintenance in response to a determination by the control unit that a first particular angle of the wingtip relative to the primary portion is in a latch pin interference range.

Example 2 includes the aircraft of Example 1, wherein the wingtip-to-latch pin drop maintenance includes instructions to: identify one or more particular latch pins that were contacted by one or more particular lugs of the wingtip; replace the one or more particular latch pins; identify a first subset of the one or more particular latch pins with visible damage as scrap; and cause a second subset of the one or more particular latch pins without visible damage to be tested for non-visible damage.

Example 3 includes the aircraft of Example 2, wherein the wingtip-to-latch pin drop maintenance further includes instructions to: replace the one or more wingtip lugs; identify a first subset of the wingtip lugs with visible damage as scrap; and cause a second subset of the wingtip lugs without visible damage to be tested for non-visible damage.

Example 4 includes the aircraft of any of Example 1 to Example 3, wherein the first signal also causes the flight control computer to schedule the aircraft for wingtip actuation system maintenance.

Example 5 includes the aircraft of any of Example 1 to Example 4, wherein the first signal indicates that the maintenance includes wingtip actuator maintenance when the determination by the electronic controller indicates the first particular angle is not in the latch pin interference range.

Example 6 includes the aircraft of any of Example 1 to Example 5, wherein the electronic controller is further configured to: receive a request from the flight control computer for position data associated with an angle of the wingtip relative to the primary portion; and send the position data to the flight control computer based on data received from a hingeline sensor, wherein the flight control computer causes the aircraft to be grounded and schedules maintenance of the aircraft when the position of the wingtip indicated by the position data is not in the folded position.

Example 7 includes aircraft of Example 6, wherein the maintenance includes brake system maintenance of a brake system configured to maintain the wingtip in the folded position.

Example 8 includes aircraft of Example 6 or Example 7, wherein the maintenance includes wingtip-to-latch pin drop maintenance when the angle of the wingtip relative to the primary portion is in the latch pin interference range.

Example 9 includes aircraft of Example 6 or Example 7, wherein the maintenance includes wingtip-to-stop drop maintenance when the wingtip is in, or near to, the flight position.

Example 10 includes the aircraft of Example 9, wherein the wingtip-to-stop drop maintenance includes: replace the wingtip lugs; replace lug stops of the primary portion; identify a first subset of the wingtip lugs with visible damage as scrap; and cause a second subset of the lugs without visible damage to be tested for non-visible damage.

According to Example 11, a method comprises: implementing, via an electronic controller of a folding wingtip system of an aircraft, an extend command received by the electronic controller from a flight control computer to rotate a wingtip of a wing from a folded position to a flight position; and in response to a first determination at the electronic controller that rotation of the wingtip stopped before the flight position during implementation of the extend command, sending a first notification signal to the flight control computer from the electronic controller to cause the aircraft to be grounded and to schedule maintenance of the aircraft, wherein the first notification signal includes one or more first error codes, and wherein the first notification signal causes the maintenance to include wingtip-to-latch pin drop maintenance responsive to a determination of the electronic controller indicating that a first particular angle of the wingtip relative to a primary portion of the wing is in a latch pin interference range.

Example 12 includes the method of Example 11, wherein, in response to a second determination that an implementation time of the extend command from a start of implementation of the extend command to completion of implementation of the extend command as indicated when rotation of the wingtip relative to the primary portion stops at the flight position is shorter than a threshold implementation time, the one or more first error codes indicate wingtip-to-stop drop, and wherein the one or more first error codes are configured to cause the maintenance of the aircraft to include wingtip-to-stop drop maintenance.

Example 13 includes the method of Example 11 or Example 12, further comprising: detecting, at the control unit, that the aircraft transitioned from a power-down state to a power-up state; determining, at the control unit, a particular angle of the wingtip relative to the primary portion; determining, at the control unit, that a last implemented command to the folding wingtip system positioned the wingtip in the folded position; and sending a signal to the flight computer to cause the aircraft to be grounded and to schedule maintenance of the aircraft when the particular angle is different than a first angle associated with the folded position.

Example 14 includes the method of Example 13, wherein the maintenance includes wingtip-to-latch pin drop maintenance when the wingtip position data indicates the wingtip is at a particular angle in the latch pin interference range.

Example 15 includes the method of Example 13, wherein the maintenance includes wingtip-to-stop drop maintenance when the wingtip position data indicates the wingtip is at, or substantially at, the flight position.

Example 16 includes the method of any of Examples 11 to Example 15, further comprising: receiving, at the control unit from the flight control computer, a second command to transition the wingtip from a first position to a second position; sending control signals to a drivetrain actuator, a hydraulic control module, or both, to implement the second command; and in response to a determination by the control unit based on drivetrain actuator data from a drivetrain actuator sensor and drivetrain position data from a drivetrain position sensor, that lock systems of latch pin actuators did not function correctly, sending a particular notification signal to the flight control computer, wherein the particular notification signal includes one or more particular error codes associated with lock system failure, wherein the particular notification signal causes the aircraft to be grounded and causes particular maintenance of the aircraft to be scheduled, and wherein the particular maintenance includes latch pin system maintenance.

According to Example 17, a device includes: a memory configured to store instructions; and a processor configured to execute the instructions to perform the method of any of Example 11 to Example 16.

According to Example 18, a non-transitory computer-readable medium stores instructions that, when executed by a processor, cause the processor to perform the method of any of Example 11 to Example 16.

According to Example 19, an apparatus includes means for carrying out the method of any of Example 11 to Example 16.

According to Example 20, a non-transitory computer-readable medium comprising instructions executable by one or more processors of an electronic controller of an aircraft to: implement an extend command received from a flight control computer to rotate a wingtip of a wing about a hinge axis from a folded position to a flight position; and in response to a first determination that rotation of the wingtip stopped before the flight position during implementation of the extend command, send a first signal to the flight control computer to cause the aircraft to be grounded and to schedule maintenance of the folding wingtip aircraft, wherein the first signal causes the maintenance to include wingtip-to-latch pin drop maintenance responsive to a second determination that indicates that a first particular angle of the wingtip relative to a primary portion of the wing is in a latch pin interference range.

Example 21 includes the non-transitory computer-readable medium of Example 20, wherein the instructions are further executable by the one or more processors to: implement a fold command to transition the wingtip from the flight position to the folded position; determine that a position of the wingtip relative to the primary portion at an end of implementation of the fold command is not at the folded position; and send a second notification signal to the flight control computer, wherein the second notification signal includes one or more second error codes associated with the position, and wherein the second notification signal causes the aircraft to be grounded and causes particular maintenance of the aircraft to be scheduled based on the one or more second error codes.

Example 22 includes the non-transitory computer-readable medium of Example 21, wherein the particular maintenance includes wingtip-to-latch pin drop maintenance when the position is in the latch pin interference range.

Example 23 includes the non-transitory computer-readable medium of Example 21, wherein the maintenance includes wingtip-to-stop drop maintenance when position is at, or is near to, the flight position.

According to Example 24, an aircraft comprises: a wing, wherein the wing includes a primary portion and a wingtip; a folding wingtip system configured to rotate the wingtip relative to the primary portion; and a flight control computer, wherein the flight control computer is configured to: in response to a first determination that a wingtip position of the wingtip is not in a folded position when a second determination indicates that a last completed command by the folding wingtip system was a fold command, set first error codes for the folding wingtip system; and change a setting to indicate that the aircraft is grounded based on the first error codes.

Example 25 includes the aircraft of Example 24, wherein the flight control computer is further configured to schedule maintenance of the aircraft based on the first error codes.

Example 26 includes the aircraft of Example 25, wherein the maintenance includes maintenance of a brake system configured to maintain the wingtip in the folded position.

Example 27 includes the aircraft of Example 25 or Example 26, wherein the maintenance includes maintenance of a wingtip actuation system.

Example 28 includes the aircraft of any of Example 25 to Example 27, wherein the maintenance includes wingtip-to-latch pin drop maintenance responsive to a third determination that the wingtip position is in a latch pin interference range.

Example 29 includes the aircraft of Example 28, wherein the wingtip-to-latch pin drop maintenance includes instructions to: identify one or more latch pins that were contacted by one or more wingtip lugs of the wingtip; replace the one or more latch pins; identify a first subset of the one or more particular latch pins with visible damage as scrap; and cause a second subset of the one or more particular latch pins without visible damage to be tested for non-visible damage.

Example 30 includes the aircraft of Example 29, wherein the wingtip-to-latch pin drop maintenance further includes instructions to: replace the one or more wingtip lugs; identify a first subset of the one or more wingtip lugs with visible damage as scrap; and cause a second subset of the one or more wingtip lugs without visible damage to be tested for non-visible damage.

Example 31 includes the aircraft of any Example 25 to Example 27, wherein the maintenance includes wingtip-to-stop drop maintenance responsive to a third determination that the wingtip position is at or near a flight position.

Example 32 includes the aircraft of Example 31, wherein the wingtip-to-stop drop maintenance includes instructions to: replace wingtip lugs of the wingtip; replace lug stops of the primary portion; identify a first subset of the wingtip lugs with visible damage as scrap; and cause a second subset of the wingtip lugs without visible damage to be tested for non-visible damage.

Example 33 includes the aircraft of any of Example 24 to Example 32, wherein the flight control computer is further configured to, in response to the wingtip position indicating that the wingtip is in the folded position and a determination to send an extend command to move the wingtip from the folded position to a flight position, send the extend command to an electronic controller of the folding wingtip system.

Example 34 includes the aircraft of any of Example 24 to Example 33, wherein the flight control computer is further configured to: send, to a first electronic controller, a first extend command to change the wingtip position from the folded position to a flight position; receive a first notification signal from the first electronic controller that indicates that the first extend command failed; change the setting to indicate that the aircraft is grounded based on the first notification signal; and schedule maintenance of the aircraft based on one or more second error codes included in the first notification signal.

Example 35 includes the aircraft of Example 34, wherein the flight control computer is further configured to: send, to a second electronic controller in response to the first notification signal, a second extend command; receive a second notification signal from the second electronic controller that indicates successful completion of the second extend command; change the setting to indicate that the aircraft is not grounded based on the second notification signal; and change a type of maintenance scheduled for the aircraft based on the second notification signal.

Example 36 includes the aircraft of Example 34, wherein the flight control computer is further configured to: send, to a second electronic controller in response to the first notification signal, a second extend command; receive a second notification signal from the second electronic controller that indicates failure of the second extend command; and amend the maintenance scheduled for the aircraft to include additional maintenance in response to the second notification signal including one or more additional error codes not included in the first notification signal.

According to Example 37, a method comprises: determining, at a flight control computer of an aircraft, a wingtip position of a wingtip in response to a determination that a last completed command by a folding wingtip system was a fold command; and in response to the wingtip position indicating that the wingtip is not in a folded position: setting, via the flight control computer, first error codes for the folding wingtip system; changing, via the flight control computer, a setting to indicate that the aircraft is grounded; and scheduling, via the flight control computer, maintenance of the aircraft based on the first error codes.

Example 38 includes the method of Example 37, wherein said determining the wingtip position of the wingtip is made in response to a transition of the aircraft from an idle or low power state to a powered state.

Example 39 includes the method of Example 37, wherein said determining the wingtip position of the wingtip is made in response to making a particular determination to send an extend command to the folding wingtip system.

According to Example 40, a device includes a memory configured to store instructions; and a processor configured to execute the instructions to perform the method of any of Example 37 to Example 39.

According to Example 41, a non-transitory computer-readable medium stores instructions that, when executed by a processor, cause the processor to perform the method of any of Example 37 to Example 39.

According to Example 42, an apparatus includes means for carrying out the method of any of Example 37 to Example 39.

According to Example 43, A non-transitory computer-readable medium comprising instructions executable by one or more processors to: determine a wingtip position of a wingtip of an aircraft in response to a determination that a last completed command by a folding wingtip system was a fold command; and in response to the wingtip position indicating that the wingtip is not in a folded position, set first error codes for the folding wingtip system; change a setting to indicate that the aircraft is grounded based on the first error codes; and schedule maintenance of the aircraft based on the first error codes.

Example 44 includes the non-transitory computer-readable medium of Example 42, wherein the instructions are further executable by the one or more processors to: send a first fold command to a first electronic controller to change the wingtip position from a flight position to the folded position; receive a first notification signal from the first electronic controller that indicates that the first fold command failed; change the setting to indicate that the aircraft is grounded based on the first notification signal; and schedule maintenance of the aircraft based on one or more second error codes in the first notification signal.

Example 45 includes the non-transitory computer-readable medium of Example 44, wherein the instructions are further executable by the one or more processors to: send a second fold command to a second electronic controller in response to the first notification signal; receive a second notification signal from the second electronic controller that indicates successful completion of the second fold command; change the setting to indicate that the aircraft is not grounded based on the second notification signal; and change a type of maintenance scheduled for the aircraft based on the second notification signal.

Example 46 includes the non-transitory computer-readable medium of Example 44, wherein the instructions are further executable by the one or more processors to: send a second fold command to a second electronic controller in response to the first notification signal; receive a second notification signal from the second electronic controller that indicates failure of the second fold command; and amend the maintenance scheduled for the aircraft to include additional maintenance in response to the second notification signal including one or more additional error codes not included in the first notification signal.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
one or more sensors configured to obtain sensor data;
a wing, wherein the wing includes a primary portion and a wingtip;
a folding wingtip system comprising a latch pin system, a first electronic controller, and a second electronic controller, wherein the folding wingtip system is configured to rotate the wingtip relative to the primary portion, and wherein the first electronic controller is configured to:
receive a fold command;
send instructions to use the latch pin system according to the fold command to fold the wingtip; and
make a first determination, based on the sensor data and when a second determination indicates that a last completed command by the folding wingtip system was the fold command, that a wingtip position of the wingtip is not in a folded position; and
a flight control computer, wherein the flight control computer is configured to:
send the fold command to the first electronic controller; and
in response to the first determination, set first error codes for the folding wingtip system;
change a setting to indicate that the aircraft is grounded based on the first error codes; and
schedule maintenance of the aircraft based on the first error codes, wherein the maintenance includes wingtip-to-latch pin drop maintenance responsive to a third determination that the wingtip position is in a latch pin interference range, wingtip-to-stop drop maintenance responsive to a fourth determination that the wingtip position is at or near a flight position, or both the wingtip-to-latch pin drop maintenance and the wingtip-to-stop drop maintenance.

2. The aircraft of claim 1, wherein the one or more sensors are further configured to monitor the folding wingtip system.

3. The aircraft of claim 1, wherein the maintenance further includes maintenance of a brake system configured to maintain the wingtip in the folded position.

4. The aircraft of claim 1, wherein the maintenance further includes maintenance of a wingtip actuation system.

5. The aircraft of claim 1, wherein the one or more sensors include a drivetrain actuator position sensor.

6. The aircraft of claim 1, wherein the wingtip-to-latch pin drop maintenance includes:
identification of one or more latch pins that were contacted by one or more wingtip lugs of the wingtip;
replacement of the one or more latch pins;
identification of a first subset of the one or more latch pins with visible damage as scrap; and
cause a second subset of the one or more latch pins without visible damage to be tested for non-visible damage.

7. The aircraft of claim 6, wherein the wingtip-to-latch pin drop maintenance further includes:
replacement of the one or more wingtip lugs;
identification of a first subset of the one or more wingtip lugs with visible damage as scrap; and
cause a second subset of the one or more wingtip lugs without visible damage to be tested for non-visible damage.

8. The aircraft of claim 1, wherein the one or more sensors include hingeline sensors.

9. The aircraft of claim 8, wherein the wingtip-to-stop drop maintenance includes:
replacement of wingtip lugs of the wingtip;
replacement of lug stops of the primary portion;
identification of a first subset of the wingtip lugs with visible damage as scrap; and
cause a second subset of the wingtip lugs without visible damage to be tested for non-visible damage.

10. The aircraft of claim 1, wherein the flight control computer is further configured to, in response to the wingtip position indicating that the wingtip is in the folded position and a determination to send an extend command to move the wingtip from the folded position to a flight position, send the extend command to the second electronic controller.

11. The aircraft of claim 1, wherein the flight control computer is further configured to:
send, to the second electronic controller, a first extend command to change the wingtip position from the folded position to a flight position;
receive a first notification signal from the second electronic controller that indicates that the first extend command failed;
change the setting to indicate that the aircraft is grounded based on the first notification signal; and
schedule maintenance of the aircraft based on one or more second error codes included in the first notification signal.

12. The aircraft of claim 11, wherein the flight control computer is further configured to:
send, to the second electronic controller in response to the first notification signal, a second extend command;

receive a second notification signal from the second electronic controller that indicates successful completion of the second extend command;
change the setting to indicate that the aircraft is not grounded based on the second notification signal; and
change a type of maintenance scheduled for the aircraft based on the second notification signal.

13. The aircraft of claim 11, wherein the flight control computer is further configured to:
send, to the second electronic controller in response to the first notification signal, a second extend command;
receive a second notification signal from the second electronic controller that indicates failure of the second extend command; and
amend the maintenance scheduled for the aircraft to include additional maintenance in response to the second notification signal including one or more additional error codes not included in the first notification signal.

14. A method comprising:
obtaining, at a flight control computer of an aircraft, sensor data from one or more sensors of the aircraft;
sending, by the flight control computer to an electronic controller of a folding wingtip system, a fold command to fold a wingtip of the aircraft;
sending, by the electronic controller, instructions to use a latch pin system of the folding wingtip system of the aircraft to fold the wingtip responsive to the fold command; and
in response to a determination by the flight control computer that a last completed command by the folding wingtip system was the fold command and that a wingtip position is not in a folded position:
setting, via the flight control computer, first error codes for the folding wingtip system;
changing, via the flight control computer, a setting to indicate that the aircraft is grounded; and
scheduling, via the flight control computer, maintenance of the aircraft based on the first error codes, wherein the maintenance includes wingtip-to-latch pin drop maintenance responsive to a third determination that the wingtip position is in a latch pin interference range, wingtip-to-stop drop maintenance responsive to a fourth determination that the wingtip position is at or near a flight position, or both the wingtip-to-latch pin drop maintenance and the wingtip-to-stop drop maintenance.

15. The method of claim 14, further comprising determining a transition of the aircraft from an idle or low power state to a powered state.

16. The method of claim 14, further comprising determining to send an extend command to the folding wingtip system.

17. A non-transitory computer-readable medium comprising instructions executable by one or more processors to:
obtain sensor data collected by one or more sensors of an aircraft;
cause a flight control computer to send, to a first electronic controller of a folding wingtip system of the aircraft, a first fold command to cause the first electronic controller to send instructions to use a latch pin system of the folding wingtip system of the aircraft according to the first fold command to fold a wingtip of the aircraft; and
in response to a determination that a last completed command by the folding wingtip system was the first fold command and that a wingtip position is not in a folded position:
set first error codes for the folding wingtip system;
change a setting to indicate that the aircraft is grounded based on the first error codes; and
schedule maintenance of the aircraft based on the first error codes, wherein the maintenance includes wingtip-to-latch pin drop maintenance responsive to a third determination that the wingtip position is in a latch pin interference range, wingtip-to-stop drop maintenance responsive to a fourth determination that the wingtip position is at or near a flight position, or both the wingtip-to-latch pin drop maintenance and the wingtip-to-stop drop maintenance.

18. The non-transitory computer-readable medium of claim 17, wherein the instructions are further executable by the one or more processors to:
receive a first notification signal from the first electronic controller that indicates that the first fold command failed;
change the setting to indicate that the aircraft is grounded based on the first notification signal; and
schedule maintenance of the aircraft based on one or more second error codes in the first notification signal.

19. The non-transitory computer-readable medium of claim 18, wherein the instructions are further executable by the one or more processors to:
send a second fold command to a second electronic controller in response to the first notification signal;
receive a second notification signal from the second electronic controller that indicates successful completion of the second fold command;
change the setting to indicate that the aircraft is not grounded based on the second notification signal; and
change a type of maintenance scheduled for the aircraft based on the second notification signal.

20. The non-transitory computer-readable medium of claim 18, wherein the instructions are further executable by the one or more processors to:
send a second fold command to a second electronic controller in response to the first notification signal;
receive a second notification signal from the second electronic controller that indicates failure of the second fold command; and
amend the maintenance scheduled for the aircraft to include additional maintenance in response to the second notification signal including one or more additional error codes not included in the first notification signal.

* * * * *